US011915200B2

(12) United States Patent
Beaver, III et al.

(10) Patent No.: US 11,915,200 B2
(45) Date of Patent: Feb. 27, 2024

(54) COLLABORATIVE VIDEO CHAT SCREEN SHARING USING A DIGITAL PRODUCT COLLABORATION PLATFORM

(71) Applicant: ZAZZLE INC., Redwood City, CA (US)

(72) Inventors: Robert I. Beaver, III, San Francisco, CA (US); Jeffrey J. Beaver, San Francisco, CA (US); Leslie Young Harvill, Olympia, WA (US)

(73) Assignee: ZAZZLE INC., Menlo Park, CA (US)

( * ) Notice: Subject to any disclaimer, the term of this patent is extended or adjusted under 35 U.S.C. 154(b) by 224 days.

(21) Appl. No.: 17/389,114

(22) Filed: Jul. 29, 2021

(65) Prior Publication Data
US 2023/0030662 A1 Feb. 2, 2023

(51) Int. Cl.
*G06Q 10/101* (2023.01)
*G06Q 10/0631* (2023.01)
(Continued)

(52) U.S. Cl.
CPC ..... *G06Q 10/101* (2013.01); *G06Q 10/06313* (2013.01); *G06Q 10/103* (2013.01);
(Continued)

(58) Field of Classification Search
None
See application file for complete search history.

(56) References Cited

U.S. PATENT DOCUMENTS 9,330,407 B2 * 5/2016 Beaver ............... G06Q 30/0601
10,719,862 B2 * 7/2020 Harvill ............... G06Q 30/0621
(Continued)

FOREIGN PATENT DOCUMENTS

WO   WO-2011140568 A2 * 11/2011 ........... G06Q 10/087
WO   WO-2018089818 A1 *  5/2018 ............. G06Q 10/08

OTHER PUBLICATIONS

A. Shamsuzzoha et al. (Collaborative Customization Strategy for Complex Products—Prospects for Engineer-to-Order and Customize-to-Order Production Scenarios), Dec. 2011, Department of Production, University of Vaasa, pp. 105-114 (Year: 2011).*
(Continued)

*Primary Examiner* — Romain Jeanty
(74) *Attorney, Agent, or Firm* — Patterson & Sheridan LLP; Malgorzata A. Kulczycka

(57) ABSTRACT

In some embodiments, a computer-implemented method comprises: receiving an indication of a particular design style; determining, based on the indication, functional product groups that comprise a plurality of custom products having indicia of the particular design style; initiating a collaboration session between a user and one or more collaborators to allow selecting one or more particular custom products; in response to receiving a selection of the particular custom products, generating a group of customized products comprising the one or more particular custom products, each particular customized product associated with a product type of a plurality of product types, each product type of the plurality of product types associated with a manufacturing constraint of multiple manufacturing constraints, each particular customized product having shared content that all of the one or more particular custom products share; obtaining manufacturing methods for manufacturing the customized particular products; and proceeding to manufacturing.

20 Claims, 10 Drawing Sheets

(51) Int. Cl.
  *G06Q 10/10* (2023.01)
  *G06Q 30/0601* (2023.01)
  *G06Q 50/04* (2012.01)

(52) U.S. Cl.
  CPC ..... *G06Q 30/0621* (2013.01); *G06Q 30/0633* (2013.01); *G06Q 30/0643* (2013.01); *G06Q 50/04* (2013.01)

(56) References Cited

U.S. PATENT DOCUMENTS

| | | | |
|---|---|---|---|
| 2014/0108188 A1* | 4/2014 | Comstock | G06F 3/1272 705/26.5 |
| 2015/0055085 A1* | 2/2015 | Fonte | G02C 7/027 700/98 |
| 2018/0276727 A1 | 9/2018 | Patel | |
| 2021/0118031 A1 | 4/2021 | Beaver, III | |
| 2022/0318874 A1* | 10/2022 | Beaver, III | G06F 16/9558 |

OTHER PUBLICATIONS

Gaoliang "A collaborative manufacturing execution platform for space product development", Dec. 2012, Int J Adv Manuf Technol 62: 443-455 (Year: 2012).*

The International Searching Authority, "Search Report" in Application No. PCT/US2022/0281906, dated Aug. 18, 2022, 16 pages.

Papachristou at al., "Machine Learning for Clothing Manufacture as a Mean to Respond Quicker and Better to the Demands of Clothing Brands: A Greek Case Study", The International Journal of Advanced Manufacturing Technology, dated Oct. 2020, 16 pages.

Current Claims in Application No. PCT/US2022/028190, dated Aug. 2022, 4 pages.

* cited by examiner

COLLABORATIVE VIDEO CHAT SCREEN SHARING USING A DIGITAL PRODUCT COLLABORATION PLATFORM

CROSS REFERENCE TO RELATED APPLICATIONS

This application is related to U.S. patent application Ser. No. 17/193,512, filed Mar. 5, 2021; U.S. application Ser. No. 17/038,659, filed Sep. 30, 2020; U.S. Pat. No. 8,090,461, granted Jan. 3, 2012; U.S. Pat. No. 8,175,931, granted May 8, 2012; U.S. Pat. No. 8,856,160, granted Oct. 7, 2014; U.S. Pat. No. 9,355,421, granted on May 31, 2016; U.S. Pat. No. 9,400,997, granted Jul. 26, 2016; U.S. Pat. No. 10,176,617, granted Jan. 8, 2019; and US published patent application no. 2013/0060654, filed Aug. 29, 2012; the entire contents of each of which are hereby incorporated by reference for all purposes as if fully set forth herein.

FIELD OF THE DISCLOSURE

One technical field of the disclosure pertains to a digital product collaboration platform that is configured to facilitate a collaborative video chat screen sharing during a digital product collaboration session. Another technical field pertains to determining design-specific context information for a functional group of customized products and determining, based on the information content and various constraints associated with the functional group, digital descriptions of the designs. Another technical field pertains to determining, based on the digital descriptions, manufacturing instructions for manufacturing corresponding digital and physical products.

BACKGROUND

The recent innovations in computer technologies have stimulated the development of collaboration platforms and applications for designing digital products. A digital product is a product that can be constructed, delivered, and presented to users digitally. Due to many recent technological advances, many digital products may be customized online as the users collaborate with each other using the functionalities of collaboration platforms. The collaboration platforms may also provide the functionalities for ordering digital files that capture interactive digital designs and digital products. Furthermore, the collaboration platforms may provide the functionalities for ordering physical products corresponding to the customized digital designs.

Customized products usually have particular aesthetic design styles. Some of them may have floral embellishments and ornaments, while others may have Victorian designs and decorations. However, typical collaboration platforms do not group the products by the design types. Instead, the typical collaboration platforms maintain catalogs of the products that are grouped by the product types, or functionalities, such as dishware, greeting cards, t-shirts, towels, napkins, and the like. Hence, a user may browse a product catalog and receive a list of, for example, all mugs even if the mugs have different aesthetic designs and styles.

Users, however, usually have their own likes, dislikes, and aesthetic preferences. Indeed, some users would prefer seeing a collection of all available products that have, for example, Victorian designs. If a user is trying to furnish his kitchen in, for example, the Victorian style, then the user would prefer browsing the Victorian design collection of all products and select some mugs, dishware, silverware, towels, napkins, and the like, from the Victorian collection instead of browsing all mugs in different styles, all dishware in different styles, and so on.

Some platforms maintain marketing and optimization search engines that are configured to keep track of the products that users selected, customized, or purchased. Based on the tracked information, the search engines may determine the most popular products and may determine compensation amounts to the designers who designed the purchased products. That type of tracking may be, however, quite inefficient because it is performed based on individual products, not based on collections of products grouped by designers. Further, that tracking may require additional processing to determine and compute the compensation amounts for each individual designer.

Suppose that a product platform showcases several designs of water bottles, and the bottles have different designs, different embellishments, and different ornaments. Suppose that a user selected a water bottle that is designed in a utilitarian-modern style. Suppose that the user likes this particular design style and would like to view other products in that design style, including gym towels, gym outfits, and the like. Unfortunately, a typical product platform would require the user to search each type of products individually, not by aesthetic designs. This may be quite inconvenient and time consuming. This may be even more inconvenient if the product platform displays hundreds of different product types of one kind.

There are also issues with profitability of typical product platforms that offer hundreds of products grouped by a product type, not by aesthetic designs. The studies show that offering too many products may be detrimental to the platform's profitability. The studies also show that users are unwilling to spend a great deal of time browsing different types of products grouped by product types. It appears that the relationship between the number of products that a platform offers and the platform's profits is shaped as a bell curve, and therefore, at some point, the more different types of products the platform offers, the smaller profits the platform receives.

Therefore, there is a need to develop and provide collaboration functionalities that allow organizing the customizable product offered by a collaboration platform based on various criteria, including aesthetic design styles, and allow utilizing the various product groupings to improve the user experience when selecting, customizing, and purchasing the products.

SUMMARY

The appended claims may serve as a summary of the disclosure.

DETAILED DESCRIPTION

Figure 1A:
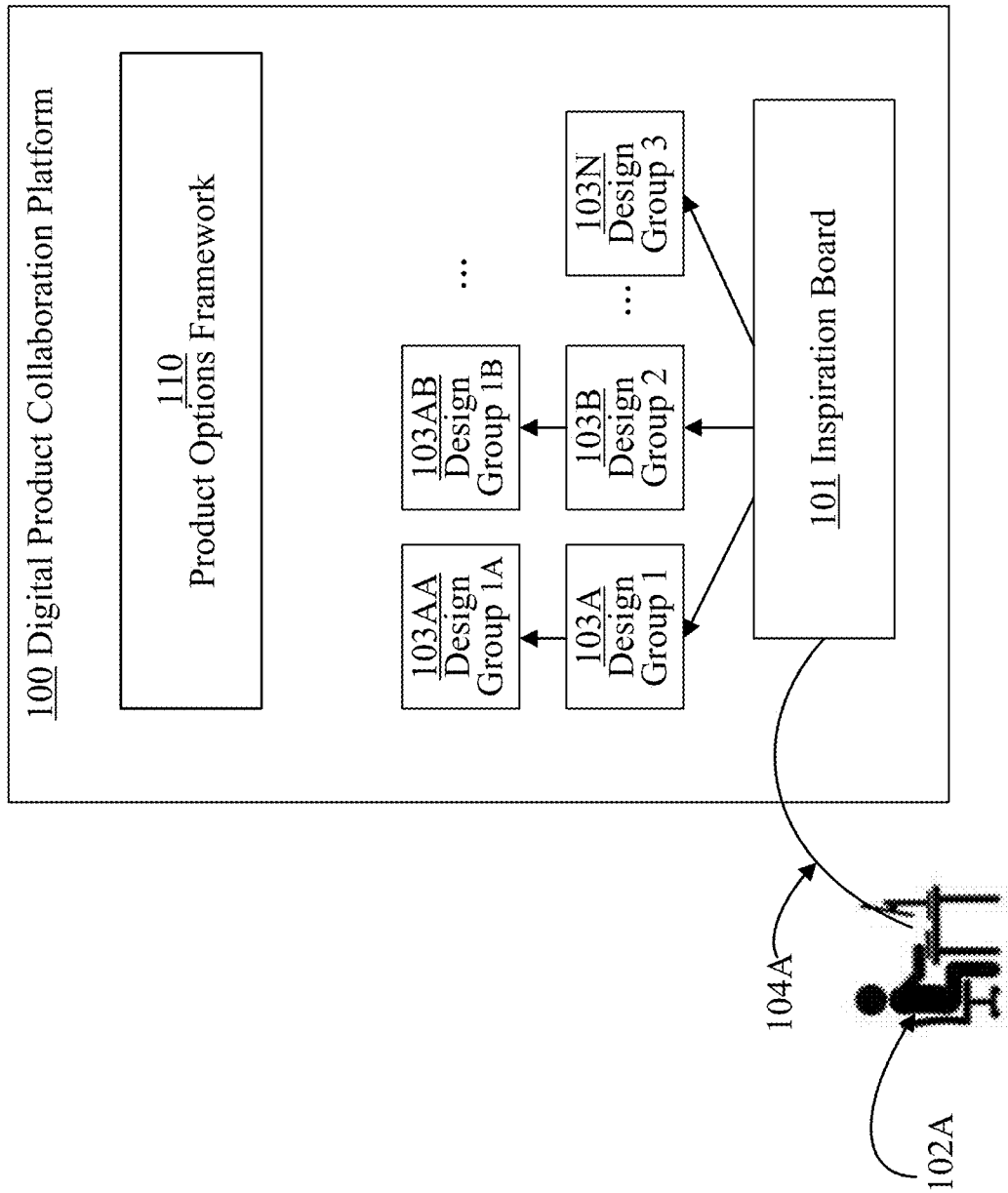
FIG. 1A is a block diagram showing an example computer configuration used in an approach for collaborative video chat screen sharing using a digital product collaboration platform.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
    1.1. FUNCTIONAL PRODUCT GROUPS
    1.2. INSPIRATION BOARD
    1.3. FROM INSPIRATION BOARDS TO CHATS AND PRODUCTS
2. EXAMPLE COMPUTER ENVIRONMENTS
    2.1. USER DEVICES
    2.2. CLIENT APPLICATIONS
    2.3. FRONT END SERVERS
    2.4. CORE SERVICES
        2.4.1. GENERATING PRODUCT DESCRIPTION DATA
        2.4.2. GENERATING KEY-VALUE PAIRS
        2.4.3. GENERATING A GRAPHICAL USER INTERFACE
    2.5. EXAMPLE MANUFACTURING SYSTEM
    2.6. EXAMPLE MANUFACTURING PROCESS
    2.7. EXAMPLE PRODUCT COLLABORATION PLATFORM
3. AESTHETIC PREFERENCES AND DESIGN STYLES
4. CONTEXT INFORMATION
5. SHARED CONTENT
6. MANUFACTURING CONSTRAINTS
7. CUSTOMIZED PRODUCTS COLLABORATION VIDEO SHARING
    7.1. OVERVIEW
    7.2. EXAMPLE PROCESS FOR COLLABORATIVE SHARING
    7.3. EXAMPLE PROCESS FOR MANUFACTURING PRODUCTS
8. EXAMPLE OF GENERATING CUSTOMIZED PRODUCTS
    8.1. COLLABORATION
    8.2. EXAMPLE OF GENERALIZATION OF CUSTOM PRODUCT OPTIONS KEY-VALUE PAIRS BASED ON GROUPING BY EVENT
        8.2.1. TEXT, IMAGE, SUBSTRATE COLOR AND TRIM COLOR ATTRIBUTES
        8.2.2. SEGMENTATION OF PRODUCT TYPES BY INTENDED FUNCTION
        8.2.3. SHARED TEXT, IMAGE, SUBSTRATE COLOR, AND TRIM COLOR ATTRIBUTES ACROSS PRODUCT TYPES
        8.2.4. CONTENT DEFAULTS FOR SHARED TEXT, IMAGE, SUBSTRATE COLOR, AND TRIM COLOR ATTRIBUTES
        8.2.5. PRODUCT GROUPING BY FUNCTION AND USE
        8.2.6. DESIGN FORM AND STYLE AS A PRODUCT FUNCTION GROUP
        8.2.7. SOCIAL EVENTS AS PRODUCT FUNCTION GROUP
        8.2.8. USER INTERFACE CONSTRUCTION FOR PRODUCT ATTRIBUTES BY FUNCTIONAL GROUPS
        8.2.9. SYSTEM FOR MANAGING MANUFACTURING CONSTRAINTS
9. KEY-VALUE PAIRS
10. COLLABORATION EXAMPLES
    10.1 USER-DESIGNER COLLABORATION
    10.2. SHARING ACCESS TO PRODUCT DESCRIPTION DATA
11. ROLE-BASED COLLABORATION PLATFORMS
    11.1. ROLE-BASED COLLABORATION
    11.2. USER ROLES
    11.3. USER PROFILES
    11.4. PRODUCT DEFINITIONS
    11.5. ATTRIBUTE REPRESENTATIONS
    11.6. GLOBAL-KEY-VALUES
    11.7. COLLABORATION COMPONENTS
        11.7.1. USER INTERFACE ELEMENTS
        11.7.2 USER INTERFACE ELEMENTS FOR DESIGN AREAS
    11.8. PRODUCT OPTIONS FRAMEWORK
    11.9. ATTRIBUTE ENGINES
    11.10. USER COMPUTERS
    11.11. COLLABORATION SERVER
    11.12. MONITORING SYSTEM
    11.13. PROCESSORS
12. MANUFACTURE OF CUSTOMIZED PRODUCTS
13. IMPLEMENTATION MECHANISMS

1. General Overview

In some embodiments, a collaboration platform provides the functionality for creating, designing, modifying, ordering, searching, and delivering custom products that the platform groups in functional product groups organized by aesthetic design types, different design genres, and the like. Because the custom products are organized according to their design types, genre and the like, collections of custom products are easy to search and thus, users can find the products having particular designs effortlessly and efficiently.

1.1. Functional Product Groups

A functional product group of custom products is a group of products that have one or more common characteristics. Generally, a functional product group may be tied to a design type, a designer, a certain look, a social moment, an event, and the like. Since a collaboration platform offers a plentitude of products, organizing the products by their functional groups allows the product searches to be efficient and effective. Furthermore, allowing the users to find the products having particular design type efficiently and effectively improves the user experience and encourages them to use the platform to create and order more products.

A functional product group may include products that have the same design type, embellishments, ornaments, decorations, genre, and the like. For example, a functional group of the products in the Victorian style may include the products that are heavily ornamented, complex, warm, dramatic, and dripping with opulence. On the other hand, a functional group of the products in the modern style, known to be opposite to the Victorian style, may include the products that use natural materials, neutral or earthy colors, and very little detailing. According to another example, a functional group of the products in the contemporary style may include the products that represent simplicity, subtle sophistication, deliberate use of texture, and clean lines. According to yet another example, a functional group of products for a particular sport team may include the products that include the insignia of the sport team and include the products that the particular team may endorse, including sweatshirts, hoodies, hats, t-shirts, towels, mugs, etc.

Since a collaboration platform may offer a plentitude of products, organizing the products by their functional product groupings allows a user to simplify their search for the products available from the platform. Instead of having a user search through, for example, a collection of all mugs offered by the platform, the user may provide some initial search query (e.g., a name of the design style, a name of a color palette, a name of a designer, and the like), and then, through interactions with a collaboration platform, make additional selections to narrow down his search of the product to one or more functional groups that include the products in which the user might be interested.

1.2. Inspiration Board

FIG. 1A is a block diagram showing an example computer configuration used in an approach for collaborative video chat screen sharing using a digital product collaboration platform. FIG. 1A, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 1A, a user 102A uses a digital product collaboration platform 100 to search for products that the user would like to customize and purchase. However, instead of browsing a catalog of all the products that platform 100 offers, user 102A searches the products by providing information to an inspiration board 101. Providing the information (element 104A) to inspiration board 101 may include dragging-and-dropping images to inspiration board 101, downloading hyperlinks, typing-in search words and phrases, typing-in names of designers, and the like.

In some embodiments, interactions between a user and a collaboration platform start from allowing a user to create an inspiration board. An inspiration board may include a collection of images, pictures, or designs that the user likes. The inspiration board may be viewed, for example, as a collection image, or a layout, showing a certain kind of design, a certain floral pattern tablecloth, certain kinds of dishes, etc., and capturing the user's style preferences. In some aspects, the inspiration board provides a whole design look rather than an individual product. An inspiration board may be implemented as a list, a collection or data stored in a database. The data may be collected by a user interface running on a variety of devices. In some embodiments, the inspiration board is implemented in the React framework for JavaScript running on a mobile device connected to a back-end service implemented in C++ running on a server. A user may be presented with the UI for an existing or empty inspiration board and a UI to browse products as previously described in, for example, U.S. patent application Ser. No. 17/240,074, U.S. patent application Ser. No. 17/038,659, and U.S. patent application Ser. No. 17/217,870. A user may select an existing product that matches their specific design sensibility and drag it to the UI area of the inspiration board. The code running on the React Framework will receive an event based on this action, and will communicate with the backend service, causing a reference to the selected product instance to be stored in the inspiration board list associated with the user in the database. A user may also perform a similar action using an individual design rather than a product as an input. A user may also drag or select an entire pre-made inspiration board to perform a similar action, producing a reference to a list in their inspiration board data list.

By providing the functionality to a user to create an inspiration board, the platform allows collecting the information about the user's style preferences and the likes. The platform may use the information included in the inspiration board to facilitate a search for, for example, mugs having particular design style. This type of search is a search performed on a higher level of abstraction than a search for just individual products. Furthermore, the platform may use the information included in the inspiration board to find not just one individual product, but a group, or a class, of products that meet the user's aesthetics and design preferences.

Referring again to FIG. 1A, collaboration platform 100 may use the information included in inspiration board 101 to find one or more functional product groups 103A, 103B, . . . 103N, 103AA, 103AB . . . , that include the products that correspond to the user's preferences in terms of aesthetics, designers, color pallets, embellishments, and the like. For example, if a user is in the process of decorating his kitchen, and the user wants to achieve a particular design look that expresses the user's individual taste and likes, then the user would start the product search by creating inspiration board 101, and providing images of things and design styles that the user likes. Then, the user would explore an entire collection of different products (e.g., tablecloths, dishes, glassware, silverware, pots, and the like) that conform to the user's design styles and that platform 100 have grouped in functional product groups 103A, 103B, . . . 103N, 103AA, and/or 103AB . . . . For instance, if a user would like to decorate his kitchen in the country style which refers to the aesthetic that represents a rural farmhouse-like design, then he would want to see collections of various products (e.g., tablecloths, dishes, glassware, silverware, pots, and the like), that incorporate pastels and bright colors with the addition of design elements like stenciling or vintage signage.

In some embodiments, collaboration platform 100 generates and maintains a plurality of functional product groupings 103A, 103B, . . . 103N, 103AA, 103AB . . . based on different types of designs or looks. For example, one functional product group maintained by platform 100 may include designs offered by a well-known design firm Marimekko, while another functional product group may include designs that include floral patterns with mostly primary colors featuring the products such as napkins, tablecloths, towels, and the like. In some embodiments, a functional product group comprises one or more products that have a specific aesthetic design, also referred to as a personal aesthetic or a personal preference.

It should be noted that inspiration board 101 is not a collage of the images that the user likes; that type of image collage would have been a Pinterest collection. Instead, inspiration board 101 is an expression of the user's personal aesthetic likes and design style preferences. In some embodiments, a choice of products included in inspiration board 101 includes information from a product description, or other design board, not just the images.

1.3. From Inspiration Boards to Chats and Products

Figure 1B:
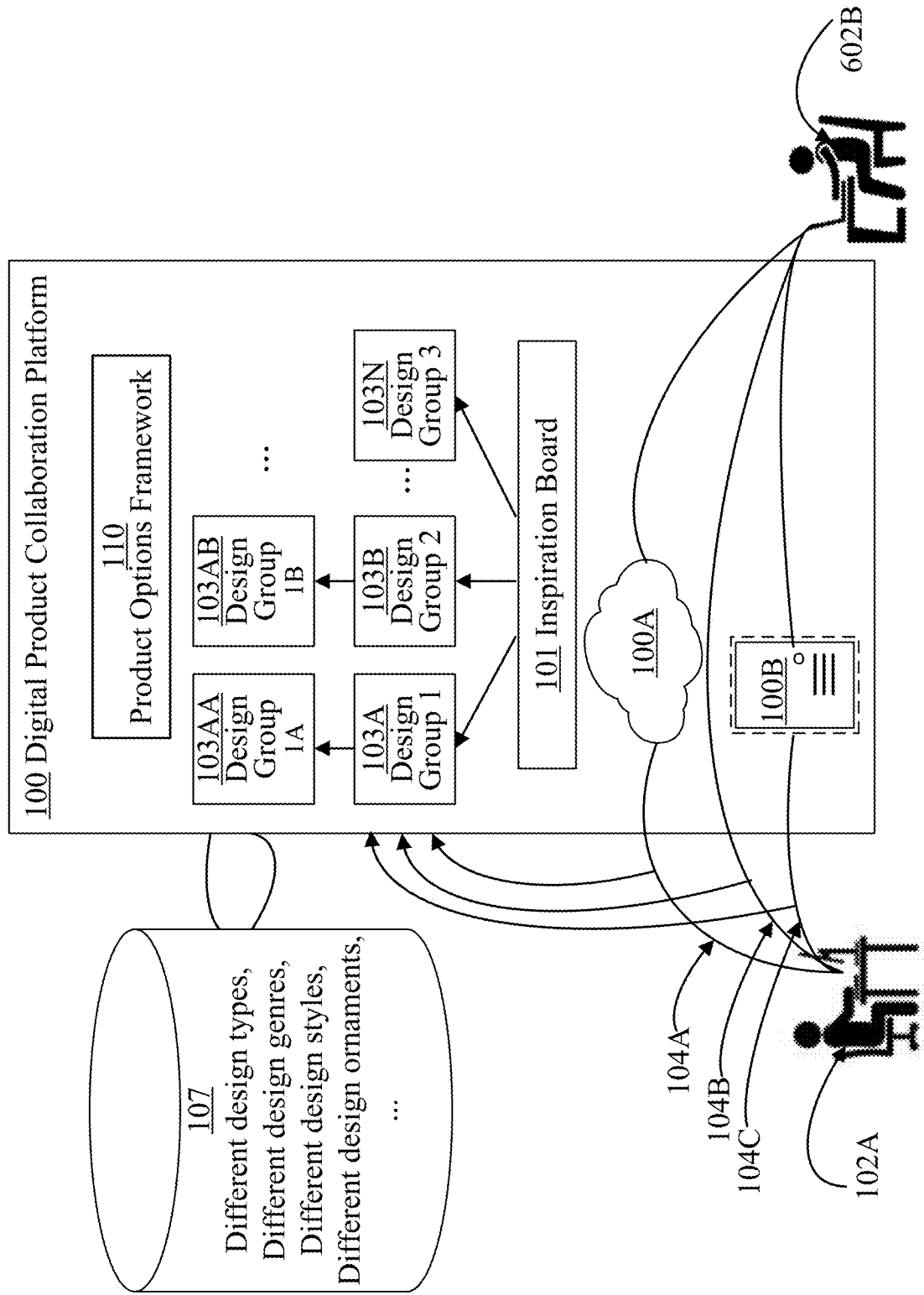
FIG. 1B is a block diagram showing an example computer configuration used in a collaborative video chat screen sharing using a digital product collaboration platform.

FIG. 1B is a block diagram showing an example computer configuration used in a collaborative video chat screen sharing using a digital product collaboration platform. In FIG. 1B, a user 102A interacts with digital product collaboration platform 100. For example, user 102A may use platform 100 to create a digital birthday card, and cause platform 100 to email the card to another user such as a user 602B.

A database 107 is configured to store information about different design types, different design genres, different design types, different design ornaments, different designers, and the like. Database 107 is generated, updated, and maintained by platform 100. Database 107 may be communicatively coupled to platform 100, as shown in FIG. 1B. Alternatively, database 107 may be a component of platform 100. Database 107 may be implemented as any type of database that provides searchability capabilities, string comparing capabilities, image comparing capabilities, and the like.

In some embodiments, platform 100 is a distributed computer system implemented in one or more servers 100B and/or one or more cloud storage systems 100A, allowing one or more modules of digital product collaboration platform 100 to cooperate with each other. Platform 100 is described in detail in FIG. 2.

In some embodiments, collaboration platform 100 comprises a product options framework 110. Product options framework 110 is a computer-based module implemented in the platform and configured to support interactions between users and the platform. The product options framework is described in detail in FIG. 2.

In some embodiments, platform 100 receives an indication of a particular design style from a user. Examples of the indications may include inspiration board 101 described above, a key word, a key phrase, a description of the user's preferences, and the like.

Based on the indication of a particular design style and definitions of different design types, different design genres, different design types, different design ornaments, and the like, stored in database 107, platform 100 determines one or more functional product groups 103A, 103B, and the like, that comprise a plurality of custom products having indicia of the particular design style. For example, if the indication suggests, or indicates, that the user likes floral patterns, then platform 100 may determine several functional groups that include collections of various products that have floral embellishments and designs.

In some embodiments, definitions stored in database 107 of different design types, different design genres, different design types, different design ornaments, and the like, may include a plurality of collections and designs that are grouped based on certain design styles. The styles may be defined using photographs depicting design styles, images of embellishments specific to design styles, images of articles showing the design styles, names of designers, words describing the design styles, and the like. Hence, determining functional product groups 103A, 103B, and the like, based on the indication of a particular design style and definitions stored in database 107 may include employing a parser, an image analyzer, an image comparator, a text comparator, and the like. Determining may include, for example, comparing the textual information included in an inspiration board (corresponding herein to an indication) and the textual information included in definitions stored in database 107. Determining the functional product groups, based on the indication of a particular design style and the definitions may also include performing a digital comparison of the digital images included in the inspiration board and the digital images included in the definitions stored in database 107.

In some embodiments, a definition of a user's style or design sensibility is determined by tagging. This method uses tags set by skilled designers for the product, design or image selected by the user and placed in their inspiration board. The overall tag for the inspiration board may be set by the most frequent occurrence of such tags found in the inspiration board data list. The tag for the inspiration board may be used to, in part, to define the user's style or design sensibility.

In some embodiments, a definition of a user's style or design sensibility is determined by setting a n-dimensional vector where each component of the vector represents a specific quality of a design. For instance, a portion of the vector may capture the color of the designs selected for the inspiration board. This may include a range and center of the color hues found in the selected colors (in the HSV color space), the average saturation of the found colors in HSV space, and/or the range and center value of the values of the selected colors found in HSV space. Additionally, a portion of the vector may capture the complexity of the designs listed in the inspiration board. The complexity may be determined by the circumference of a segment in the design divided by half of the square root of its area (circumference/(0.5*sqrt(area))), such that a circle has a complexity of 1.0, and an ornate shape has a complexity of 10 or more. The complexity sub-vector may contain the median complexity of all segments in the design, the maximum and minimum complexity of the segments, and the segment count. Additionally, a portion of the vector may be composed of the sharpness of the designs listed in the inspiration board. The sharpness of a segment may be determined by determining the distance in the Euclidean space between the outline of a segment and the same outline smoothed by a pseudo Gaussian IIR filter. The sharpness sub-vector may contain the median sharpness of all segments in the design, the maximum and minimum sharpness of the segments, and the segment count.

Each embodiment of a definition of the user's style or design sensibility, taken separately or together, provides a method to compare and match to other design boards, and to the product option key-values set for a corresponding product.

Platform 100 may initiate a collaboration session between user 102A and one or more collaborators, including user 602B to cause displaying a plurality of custom products on a user device and on collaborators devices, to allow the user and the one or more collaborators to view the plurality of custom products, and to select, from the plurality of custom products, one or more particular custom products. For example, platform 100 may initiate the collaboration session between user 102A and one or more collaborators, including user 602B, and display one or more collections of products selected from 103A, 103B, 103N, 103AA, 103AB, that may include napkins, towels, teacups, mugs, and the like, having floral embellishments. Examples of collaboration sessions include collaboration video chats. The video chats may be used as part of collaborative video chat screen sharing using the collaboration platform.

If the user selects some particular products from the displayed collections, then, based on the selected particular products, platform 100 may determine, for each particular customized product, the product's associated product type of a plurality of product types.

Furthermore, for each product type of the plurality of product types, platform 100 determines a manufacturing constraint of multiple manufacturing constraints. The constraints are described in detail later.

Moreover, for each particular customized product, platform 100 determines shared content that all of the one or more particular custom products share. The shared content is described in detail later.

Subsequently, for a particular customized product from the group of customized products, platform 100 obtains a manufacturing method for manufacturing the customized particular product and determines a product type of the customized particular product and a manufacturing constraint associated with the product type.

Based on, at least in part, the manufacturing constraint, platform 100 determines physical constraints and manufacturing instructions for manufacturing the customized particular product using the manufacturing method. Then, platform 100 generates transformed shared content by transforming the shared content, which all of the one or more particular custom products share, to satisfy the physical constraints for manufacturing the customized product. The transformed shared content may be stored in association with the group of customized products for manufacturing the customized particular product. Then, platform 100 may send the manufacturing instructions to a manufacturer. This process is described in detail later.

2. Example Computer Environments

In some embodiments, an approach for a customized products collaboration video sharing is implemented in a product collaboration platform. The platform allows users, designers, agents, customers, and support engineers, to collaborate with each other on designing and creating digital designs of customized products. A customized product may be a digital product, such as a digital gift card, or a physical product, such as a physical t-shirt. An example computer environment is described in FIG. 1C.

Figure 1C:
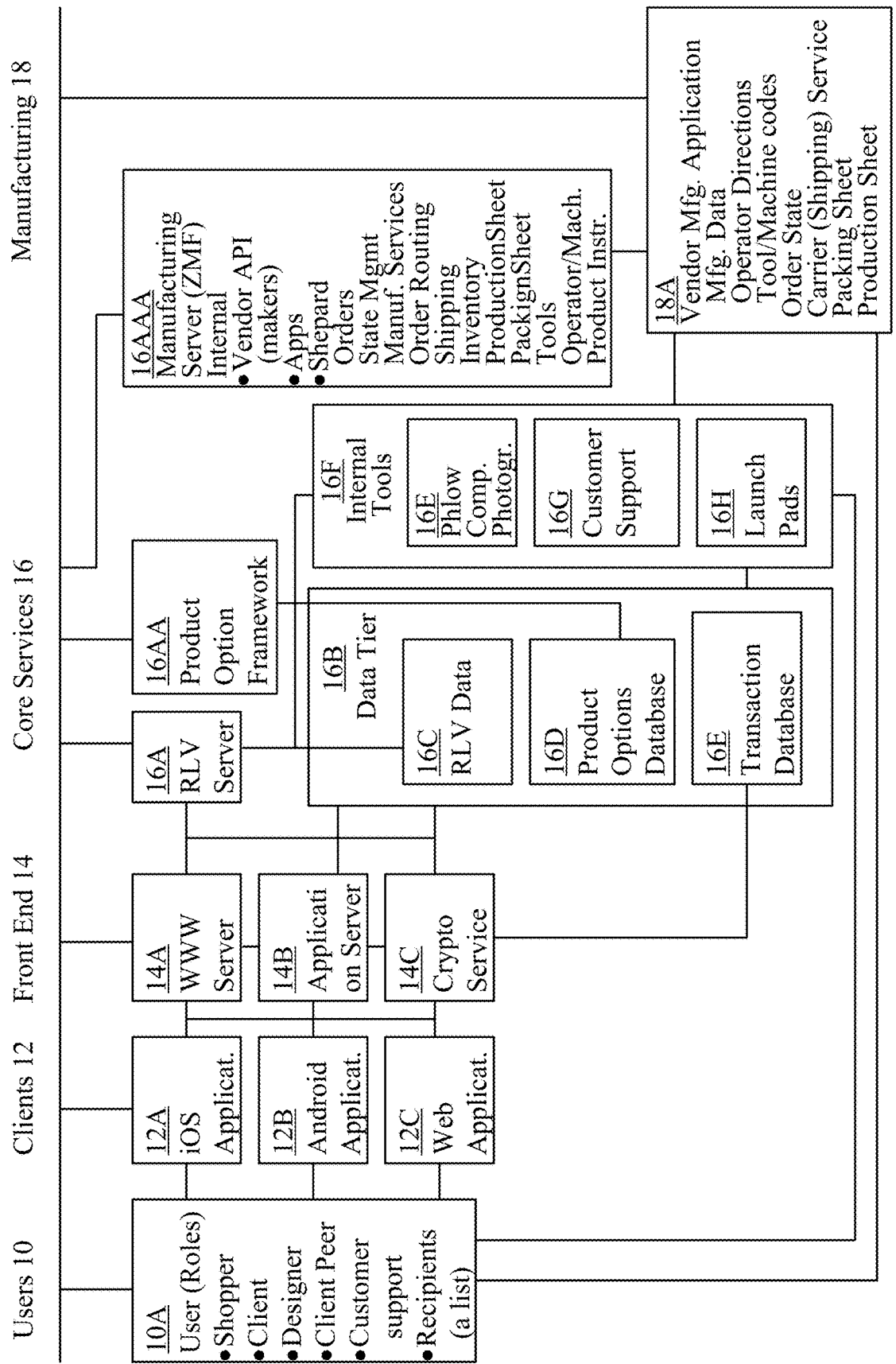
FIG. 1C is a block diagram showing an example computer system for providing a role-based collaborative platform.

FIG. 1C is a block diagram showing an example computer system for providing a role-based collaborative platform. In FIG. 1C, users 10 are individuals who create and design digital designs of products; clients 12 correspond to software applications configured to facilitate communications between users 10 and front end servers 14; core services 16 correspond to software applications and tools configured to facilitate creating and designing of the digital designs and generating manufacturing instructions for manufacturing final products based on the digital designs; and manufacturing 18 corresponds to manufacturing servers and applications configured to manufacture, or cause manufacturing, the final products, generate tokens that allow recipients of the final products to request services and access to core services 16, and attach the tokens to, or depict the token on, the final products.

2.1. User Devices

FIG. 1C depicts several examples of users 10. Each of users 10 may use its own, or shared, computer device. Examples of user devices are described later in FIG. 2 (see devices 140A-G).

In some embodiments, examples of users 10 are determined based on the roles that may be assigned to the users. Examples 10A of roles may include a user, a designer, a client peer, a user support engineer, a recipient, and the like. Examples of user roles are described in detail in FIG. 7.

2.2. Client Applications

Clients 12 in FIG. 1C refer to client applications that are implemented in client servers and that are configured to support requests received from users 10A. Non-limiting examples of Clients 12 may include iOS applications 12A, Android applications 12B, Web applications 12C, and the like.

2.3. Front End Servers

Front end servers 14 refer to computer-based servers that are configured to process requests received from clients 12 and from core services 16. Examples of front end servers 14 include one or more WWW servers 14A, one or more application servers 14B, one or more cryptographic servers 14C. Cryptographic servers 14C may be configured to provide cryptographic services for encrypting/decrypting, transmitting, or otherwise communicating data between the entities depicted in FIG. 1C.

2.4. Core Services

Core services 16 (in FIG. 1C) refer to servers and services implemented in a role-based collaboration platform configured to provide functionalities for creating and designing digital designs, handle collaboration requests, and facilitate the customization requests received from users 10. The role-based collaboration platform is described in detail in FIG. 2.

2.4.1. Generating Product Description Data

Referring again to FIG. 1C, a customization process performed by a user, of users 10, and intended to generate a digital design of a customized product is captured in so-called product description data, which then may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and/or 3D patterns that may be used to cut, cast, or form physical components of physical final products. The patterns may be parametric, i.e., they may have parameters that, through encoded relationships, adjust the form of the pattern for a specific need.

For instance, a set of 2D patterns for a t-shirt graded based on size, may become a parametric pattern by interpolating grade curvatures. A single parametric value may set this automatic grading. The single parametric value is usually called a 'size.'

The product instructions may also include models, including 2D and 3D models that are used to form, through additive manufacturing, or subtractive manufacturing, portions of a product. The models may be parametric, i.e., they may have parameters that, through coded relationships, adjust the form of the model for a specific need. For instance, a set of 3D models may represent a bike helmet.

Each model may fit a statistically normed human head of a specific age. A coded relationship between the models may allow for interpolation of the set of models for a specific age. A single parametric value may set the automatic interpolation. The single parametric value in this case is usually called an 'age.'

The product instructions may also include material properties such as a physical material used to form a product from a pattern. Some material properties may be parametric, i.e., they may be selected or changed during the manufacturing time.

The properties may also include a body color. For instance, the color of a fabric may be selected for manufacturing a t-shirt. According to another example, the color of a plastic may be selected for manufacturing a bike helmet.

The properties may also include a body texture such as the fabric weave of a t-shirt may be specified to be smooth or slubby. For instance, the surface of a plastic bike helmet may be polished or satin. Each property is necessarily specific to each class of materials. Examples of materials and properties may include a fabric (such as a weave or knit type, a fiber type (cotton, wool, flax, polyester, polypropylene), a thread size, a thread count, a color, an integral design (ikat, knit, tapestry), a bolt width, a selvage type, a surface (hand), and the like.

The properties may also include plastics, which may include sub-properties such as a color, a surface quality (a bidirectional luminance function), a melting point, impact resistance, a forming method (thermoplastic, cast), a type (acrylic, abs, polypropylene, etc.), and the like.

The properties may also include metals, which may include sub-properties such as a type (aluminum, steel, copper, brass, etc.), a color, a surface quality (e.g., a bidirectional luminance function), a melting point, a tensile strength, a shear strength, a toxicity, and the like.

The properties may also include non-woven specified by a type (paper, felt, Tyvek, etc.), a color, a surface quality (e.g., a bidirectional luminance function), a surface type (hot pressed, natural, textured, etc.), a weight per square meter, an acid content, a compatible media, coating, and the like.

The properties may also include metamaterials which may be described as a combination of multiple materials created during a manufacturing process. For instance, during a fused deposition manufacture, plastics with a variety of properties may be mixed to provide a physical product with gradations of flexibility, durometer, and the like. According to another example, during laser sintering of metals, a mix of metal alloys with a variety of properties may be deposited, resulting in a product composed of gradations of metallic properties. According to yet another example, during high resolution uv-printing, layers of the uv-cured material with different refractive indices may be deposited, resulting in a large variety of optical effects.

The properties may also include embellishment such as a trim-color, designs, and applied ornaments. The trim colors may indicate the color of the edging around the sleeve of a t-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and may allow for a limited set of properties to be transferred from one product to another. Other properties may be specific to a particular product or manufacturing method.

It may be appreciated that much of the novel art of the system and method is in enumerating the constraints imposed by manufacturing a specific custom product and crafting these constraints as a set of product option key-value pairs. The manufacturing constraints are propagated through the entire system and method, and by using these product option key-values, allowing for the manufacturing of a series of custom products that meet these physical constraints.

Referring again to FIG. 1C, in some embodiments, core services 16 refer to services implemented in a role-based collaboration platform. In the depicted example, core services 16 may be provided by one or more real-view (RLV) servers 16A and a product option framework 16AA. Both RLV servers 16A and product option framework 16AA may use one or more data tier databases 16B, including RLV Data 16C, a product options database 16D, a transaction database 16E, and the like. Examples of the RLV approaches are described, for example, in U.S. Pat. Nos. 8,856,160, 9,436, 963, 8,654,120, 8,712,566, 8,958,633 B2, and 9,436,963; and U.S. patent application Ser. Nos. 17/193,512, 17/143, 955, 17/038,659, and 16/867,898.

In some embodiments, core services 16 may also utilize internal tools 16F, such as a "Phlow" computational photo-graphical tools 16E, a customer support tools 16G, a launch pads tools 16H, and the like.

Product option framework 16AA is also referred to as a persistent design data framework. The framework data may include a product options set, which may include a set of product options pertaining to a specific product type. In some embodiments, depicted in FIG. 2, a set of product options contains the product instructions generated by, for example, a product option framework 110 and collaboration components 106, shown in FIG. 2, for manufacturing, or producing, the product. Examples of the product option frameworks are described, for example, in U.S. Pat. Nos. 8,856,160, 9,436,963, 8,654,120, 8,712,566, 8,958,633 B2, and 9,436,963; and U.S. patent application Ser. Nos. 17/193, 512, 17/143,955, 17/038,659, and 16/867,898.

Referring again to FIG. 1C, product option framework 16AA is configured to provide services for transforming ProductOption key-value pairs (i.e., manufacturing constraints) from one product to the other. Transforming the ProductOption key-value pairs from one product to another may require, for example, transforming the color space (i.e., sRGB to CMYK US Web Coated (SWOP) v2), transforming an image from raster to vector, and/or resizing the image for the fit. An example use case of the product option framework is described in detail in FIG. 2.

In some embodiments, there are two basic types of product instructions (1) fixed (that include the instructions for the product which are fixed and not customized), and (2) custom (that contain the logic to transform a user interface parameter into a product instruction).

In some embodiments, the product option set contains the logic to enumerate each customizable option in a manner that presents a complete user interface to change the parametric product instructions.

The instructions for manufacturing a customized product are usually parametric. The parameters include the size of the customized product (this can be multi-dimensional, and include width, height, depth). The parameters may also relate to human sizes or ages. The parameters may also be custom and based on biometric information.

The parameters may also include a component body color, a component body texture, a trim body color, a trim body texture, a design area, and the like.

2.4.2. Generating Key-Value Pairs

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key-value pairs may include a single element, such a length or a ribbon, a vector, such as a size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiments, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type through a well-known relationship.

In some embodiments, a product option framework event chain includes one or more products, and the chain may represent or memorialize an event. The products may represent or memorialize an event. Examples of events may include invitations, save the date cards, birthday cards, birthday gifts, anniversary cards, birth announcements, RSVP cards, holiday cards, holiday gifts, thank-you cards, get-well cards, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may fit into a birthdate event may include the following products: invitations, RSVPs, party bags, party keepsake photos, and the like.

In some embodiments, in a product option set event chain, a key-value pair encodes the next product in the chain. For example, an invitation may be chained to an RSVP card. A key-value may also encode the role for the chained event. For example, a chained RSVP card key-value may further include a recipient of the invitation as the sender role for the RSVP card.

A key-value pair may also encode the shared properties used to set the chained product's properties. For instance, a design for the invitation may be shared with the RSVP card. A key-value may also encode the timing for the chained product. Typically, the event chain properties are custom (parametric), and they may be changed by a product designer to fit a specific product set.

2.4.3. Generating a Graphical User Interface

In some embodiments, a product option framework is configured to generate a product option framework user interface. Accordingly, each product option set is associated with logic and code to build a user interface element for each parametric product option. Furthermore, each product options set contains style hints so that each user interface element may be artfully placed to produce a high quality user experience.

Typically, user interface elements are designed to match each class of values found in all products covered by a product option framework. New user interface elements may be added as the product categories expand. The user interface elements may include a design view, a color editor, a font editor, a size selector, a texture selector, a text editor, a fabric swatch selector, a product real view, and the like.

In some embodiments, a product options framework cooperates with a user product renderer that may be implemented in, for example, a RealView server 16A. The user product renderer may be configured to render views of a custom product as though it is already manufactured. Typically, it uses a product option set of key-values as input. It creates one or more run-time assets using computational photography of the manufactured product.

2.5. Example Manufacturing System

Referring again to FIG. 1C, manufacturing instructions may be communicated from core services 16 to manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, and the like. Some of that information may be communicated to a carrier (shipping) service selected to deliver the final products to the recipients.

For creation of RealView assets, a final product may be manufactured using markups. A markup for, for example, a body color of a product may be made by specifying a distinct and separate color for BodyColor key-value. A markup for the trim color of a product may be made by specifying a distinct and separate color for, for example, a TrimColor key-value pair. A markup for a design area of a product may be made by specifying a specific marker type (e.g., a removable linear markup, a digital markup, or a digital field markup) for a design-area image.

Construction of a so-called Product RealView geometry may be performed using computational photographic techniques using products manufactured with markup. For example, a BodyColor area of a surface may be recognized and layered as a custom computer graphics shader for rendering light, color, and texture. Each TrimColor area's surface may be recognized and layered as a custom computer graphics shader for rendering light, color, and texture. Rendering of the Product RealView may be performed by setting its product option key-values, and shading each of its constructed layers.

2.6. Example Manufacturing Process

A manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some embodiments, a product options framework (described in detail in FIG. 2) builds an interface for a key called OutputStyle. The interface for the OutputStyle key may allow a designer (or any other collaborator) to select values for the media for the presentation of an interactive design. The choices may include a JPEG_Image, a GIFF_Image, and an H264_Video.

If a designer chooses the GIFF_Image option, then the product options framework may send the instructions to the manufacturing system to traverse each of the key-values in the KeyValueJournal, and for each key, and use a User Product Renderer to render the state of the custom physical product with that modification as images in the sRGB 32-bit RGBA format. Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8 bit Indexed color.

Then, the manufacturing system may embed a digital watermark which encodes the input KeyValueJournal's UUID in the 8 bit indexed color image cache.

Next, the manufacturing system may begin encoding the image file. For example, the manufacturing system may write the header bytes; write the Logical Screen Descriptor bytes; write the found color palette as a Gif Global Color Table; write the gif 8 bit character application name; and embed metadata as a comment (or a watermark) which encodes the input KeyValueJournal's UUID.

Next, the manufacturing system sets a FrameCount to 1 and proceeds to processing each frame in the image file. The processing includes checking if there is an image in the 8 bit indexed color image cache; and if so, then the manufacturing system continues; otherwise, the manufacturing system proceeds to taking the next image.

To continue, the manufacturing system writes the gif Graphic Control Description for the FrameCount, and then processes the first 8 bit indexed color image cache into blocks of 255 LZW compressed bytes.

Next, the manufacturing system writes the compressed bytes, and removes the first image from the 8 bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, executing the manufacturing instructions for the purpose of manufacturing the product ends, and the manufacturing of the product is completed.

2.7. Example Product Collaboration Platform

In some embodiments, the approach for generating customized products in collaboration with live designers and agents is implemented in one or more computer systems that host a product collaboration platform. Alternatively, the approach may be implemented in one or more computer systems that communicate with the collaboration platform but that do not actually host the platform itself. For the clarity of the description, it is assumed that the computer environment supporting the approach presented herein is implemented in the product collaboration platform.

Figure 2:
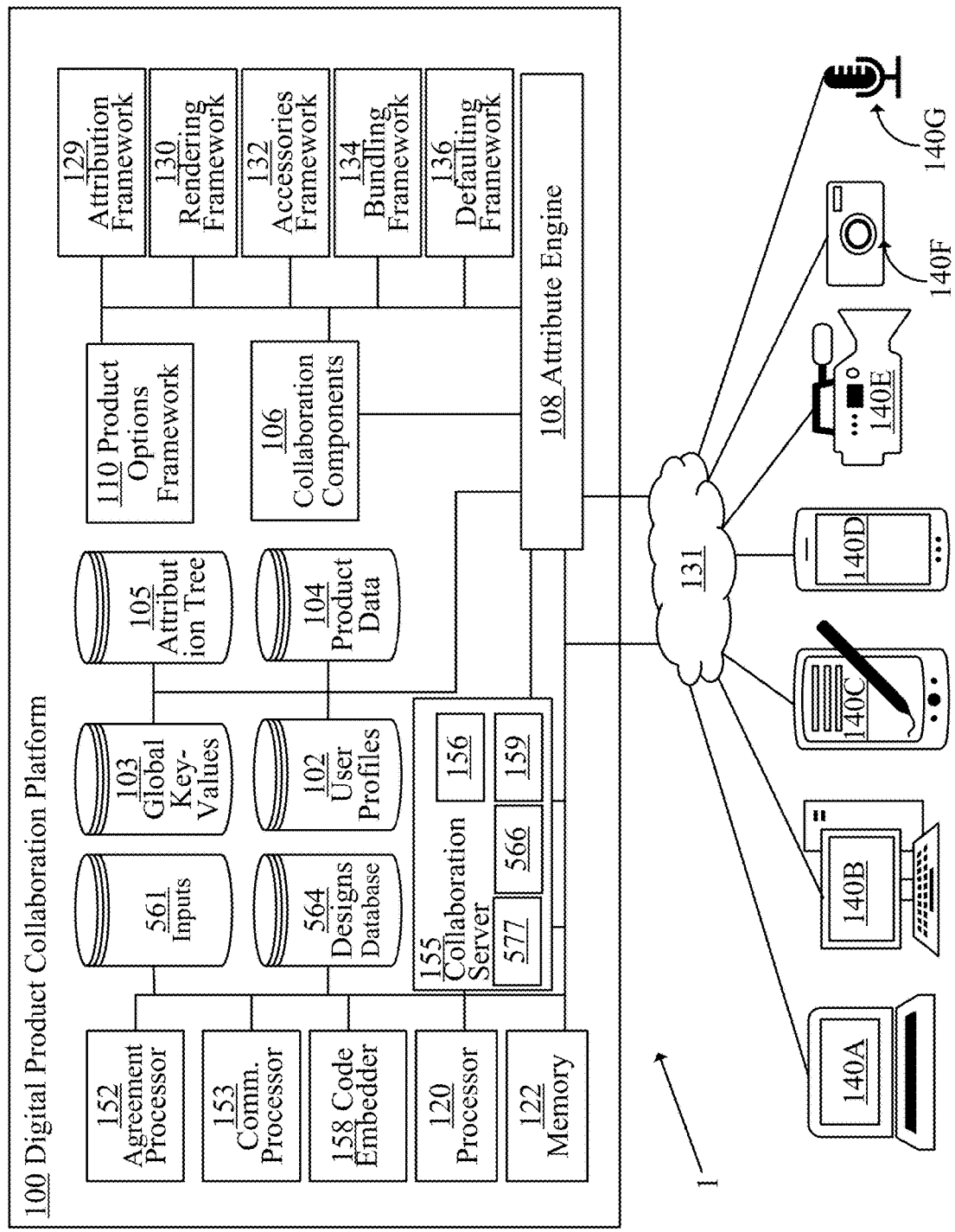
FIG. 2 is a block diagram showing an example of a role-based collaboration platform.

FIG. 2 is a block diagram showing an example of a role-based collaboration platform 1. In the example depicted in FIG. 2, a digital product collaboration platform 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, digital product collaboration platform 100 includes a collaboration server 155, one or more designer databases 562, one or more design databases 564, an agreement processor 152, a communications processor 153, and a code embedder 158. Digital product collaboration platform 100 may communicate directly, or via one or more communications networks 130, with one or more user computers 140A-140G, all described in detail later.

In some embodiments, collaboration server 155 comprises a monitoring system 156, a request analyzer 159, an interactivity module 577 and a designer selector 566. Additional modules may also be included in collaboration server 155. Details about collaboration server 155 are described later.

Digital product collaboration platform 100 shown in FIG. 2 is provided herein to illustrate clear examples and should not be considered as limiting in any way. Other computer collaboration systems may include additional components such as computer servers, various input/output devices, and additional software and/or hardware components that are not depicted in FIG. 2. Other computer collaboration systems may be implemented in cloud-based systems, distributed computer networks, and the like.

In some embodiments, computer collaboration platform 100 may include fewer components than example digital product collaboration platform 100 shown in FIG. 2. Digital product collaboration platform 100 is described in detail later.

3. Aesthetic Preferences and Design Styles

A user may have personal preferences for embellishments and design styles with regard to products and goods. A personal preference, also referred to as a personal aesthetic, may be mapped onto actual products that can be manufactured. The aesthetic may correspond to real products, both digital and physical, that can be purchased using platform 100.

Figure 4:
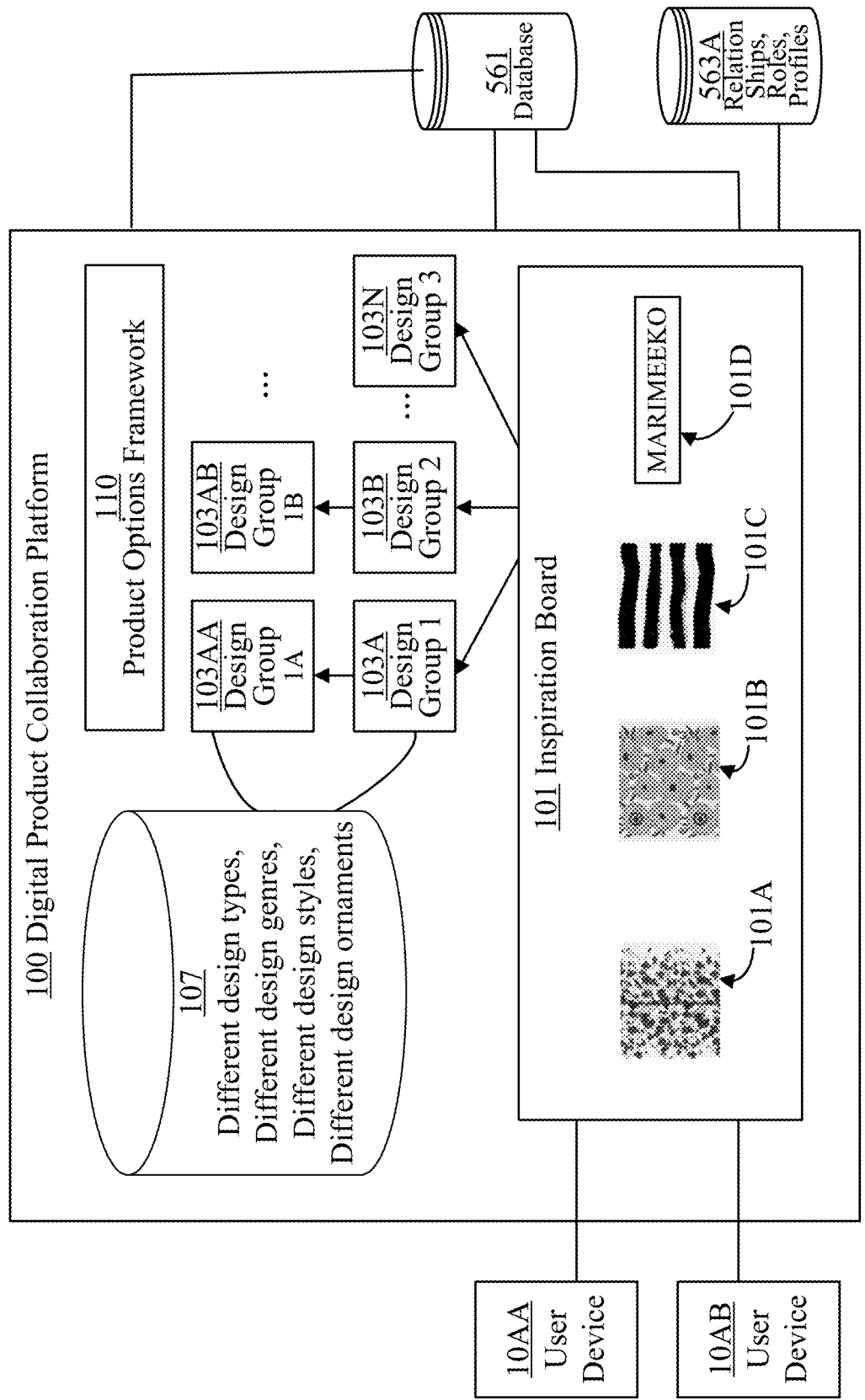
FIG. 4 is a collaboration example of creating an inspiration board.

FIG. 4 is a collaboration example of creating an inspiration board. Inspiration boards may be created by individual users or as a collaboration effort including virtual chats, collaboration sharing and the like. Suppose that a user of user device 10AA is planning her wedding and she wants to involve some of her friends, including a user of user device 10AB, in selecting some products such as wedding invitations, and the like. One way to select an aesthetic style of the invitations is by inviting the friends to compose inspiration board 101 and use the board to collect the ideas, photographs, suggestions, names of the favorite designers, and the like. The inspiration board may be viewed as a real view of the favorite design styles and the things that may be used to select one or more functional groups that capture the user's aesthetic designs.

Putting together an inspiration board of a collection of aesthetic designs may be facilitated by platform 100 by generating and providing to the users a portal that the users may use to fill in with photograph such as a photograph 101A, an image of textile material 101B, a sample jewelry piece 101C, a name of a favorite designer 101D, and others such as color palettes, examples of embellishments, examples of ornaments, and the like.

The information provided and stored in inspiration board 101 and definitions of different design types, different design genres, different design types, different design ornaments, and the like, stored in database 107 may be used by digital product collaboration platform 110 to select one or more design groups from groups 103A, 103B, 103N, 103AA, 103AB, and the like. The groups may include definitions of various design types, genres, styles, ornaments, and the like, as shown in database 107 in FIG. 4.

Alternatively, or in addition to, the information about the groups and the contents of the groups may be stored in database 561, described in detail in FIG. 2.

Access to inspiration board 101 may be determined based on relationships between users, roles of the users, user profiles, and the like. That information may be stored in, for example, database 563A, described in detail in FIG. 2.

4. Context Information

An approach for a customized products collaboration video sharing may include collecting and maintaining knowledge of the context of the interactions between users and a collaboration platform. That may include collecting information about the type of the users' interactions, the timing of the interactions, the requests received from the users, the customized designs created by the users, and the like. The context information may include the data collected during the user's interactions with the platform, the data stored in the user's profile, the historical data collected for and about the user, the data about the products that the user created, customized and/or purchased, and the like.

Context information may be used to provide the form of the transactions between the users and the platform and to track the users' visits on the platform. The context information may also be used to unlock additional interaction opportunities for future transactions between the users and the platform.

Depending on the type of interactions between users and a collaboration platform, different context information may be collected. Referring again to FIG. 1B, when user 602A interacts with platform 100 to select and purchase a pet bowl for his dog, the related context information may include information about the user's dog, the type of bowl that the user selected, the type of food that the user has ordered, and the like.

According to another example, when user 602A interacts with platform 100 to plan his wedding, the related context information may include information about the date for the wedding, the names of guests that the user is inviting for his wedding, the relations between the guests and the user, and the like.

According to other example, when user 602A interacts with the platform to create invitations to his birthday party, the related context information may include information about the date of the user's birthday, the names of the quests that the user is inviting to his party, the relations between the quests and the user, and the like. Details about the context information are described later.

In some embodiments, based on context information collected based on, and about, a particular visit of user 602A on platform 100, the platform creates a bi-directed graph of user interactions where the graph nodes are represented by the individual user data, and the connected directional graph arcs are represented by the role-based transactions to and from each user. In this manner the graph captures relationships between the user and other users or guests and captures and memorializes experiences that are highly relevant to the particular visit. The platform may also capture information about the products that user 602A has customized or created, the guests that the user invited, and the like. The context information may, therefore, be viewed as a fundamental building block for extending interactions between the users and the platform and for expanding the utilization of the platform in terms of supporting and memorializing the present and future events.

In some embodiments, an approach for a customized products collaboration video sharing utilizes key-value pairs that capture information and design details of products that users created or used while interacting with the platform. The key-value pairs may describe the appearance, finishes, and other characteristics of the product. The key-value details may be then processed to determine context constraints, which in turn may be used in the approach for a customized products collaboration video sharing. Details about key-value pairs and constraints are provided later.

Suppose that user 602A is creating and customizing a birthday card for his friend, user 602B, by interacting with platform 100. As user 602A interacts with the platform, context information related to the interaction may be collected and saved. That information may include a date of the birthday, a name of user 602B, additional information about user 602B, such as his age, his likes and don't-likes, and the like. The context information may also include additional information about the birthday celebration, including a theme for the birthday party, gift information for the party, and the like. That information may be obtained by the platform via a user interface that the platform may generate and display for user 602A.

Collected context information may be used to unlock, or to enable, additional interaction opportunities for future transactions between the users and platform 100. For example, if the collected context information indicates that user 602A is creating a birthday card for user 602B, then platform 100 may suggest to user 602A to create a memory-based event for his own birthday. In addition, or in alternative, platform 100 may suggest to user 602A to create a memory-based birthday event for any person that user 602A knows, including user 602A himself, user 602B, and the like.

5. Shared Content

In some embodiments, shared content comprises a shared set of text, image, or color content that all customized products of a group of customized products share, and that can be applied to each customized product of the group of customized products. The shared set of text, image, or color content corresponds to attributes that may be applied to any customized product in the group of customized products. For example, if a user creates an invitation to a family reunion, that then shared content that all products (an invitation card, a reunion-celebration t-shirt, a reunion-celebration polo shirt, a reunion water bottle, and the like) will share may include the name of the family, the date, the location of the reunion celebration, and the like.

The shared set of text, image, or color content may be captured by a plurality of key-value pairs corresponding to shared content attributes shared by customized products of a group of customized products.

The shared content attributes for the group of customized products may be used to automatically build a graphical user interface for the approach for a customized products collaboration video sharing. The graphical user interface may be configured to accept inputs for one or more attributes that are not provided by the shared content attributes.

In some embodiments, shared content attributes for the group of customized products are subject to transformation, translation and constraining for each separate product within the group of the customized products.

6. Manufacturing Constraints

In some embodiments, one of multiple manufacturing constraints are specific to a type of a customized product from a group of customized products. The multiple manufacturing constraints may be applied to content attributes of at least two customized products from the group of customized products. Examples of manufacturing constraints for, for example, a digital invitation may include a ppi specification, a process color, a white base, a fixed size, and the like.

7. Customized Products Collaboration Video Sharing

7.1. Overview

An approach for collaborative video chat screen sharing using a digital product collaboration platform may include collecting and maintaining knowledge of the context of the interactions between users and a collaboration platform. That may include collecting information about the type of the users' interactions, the timing of the interactions, the requests received from the users, the customized designs created by the users, and the like. The context information may include the data collected during the user's interactions with the platform, the data stored in the user's profile, the historical data collected for and about the user, the data about the products that the user created, customized and/or purchased, and the like.

Context information may be used to provide the form of the transactions between the users and the platform and to track the users' visits on the platform. The context information may also be used to unlock additional interaction opportunities for future transactions between the users and the platform.

Depending on the type of interactions between users and a collaboration platform, different context information may be collected. Referring again to FIG. 1B, when user 602A interacts with platform 100 to select and purchase a pet bowl for his dog, the related context information may include information about the user's dog, the type of bowl that the user selected, the type of food that the user has ordered, and the like.

According to another example, when user 602A interacts with platform 100 to plan his wedding, the related context information may include information about the date for the wedding, the names of guests that the user is inviting for his wedding, the relations between the guests and the user, and the like.

According to other example, when user 602A interacts with the platform to create invitations to his birthday party, the related context information may include information about the date of the user's birthday, the names of the quests that the user is inviting to his party, the relations between the quests and the user, and the like. Details about the context information are described later.

In some embodiments, based on context information collected based on, and about, a particular visit of user 602A on platform 100, the platform creates a bi-directional graph of user interactions where the graph nodes are represented by the individual user data, and the connected directional graph arcs are represented by the role-based transactions to and from each user. In this manner the graph captures relationships between the user and other users or guests and captures and memorializes experiences that are highly relevant to the particular visit. The platform may also capture information about the products that user 602A has customized or created, the guests that the user invited, and the like.

In some embodiments, an approach for a customized products collaboration video sharing utilizes key-value pairs that capture information and design details of products that users created or used while interacting with the platform. The key-value pairs may describe the appearance, finishes, and other characteristics of the product. The key-value details may be then processed to determine context constraints, which in turn may be used in the approach for a customized products collaboration video sharing. Details about key-value pairs and constraints are provided later.

Suppose that user 602A is creating and customizing a birthday card for his friend, user 602B, by interacting with platform 100. As user 602A interacts with the platform, context information related to the interaction may be collected and saved. That information may include a date of the birthday, a name of user 602B, additional information about user 602B, such as his age, his likes and don't-likes, and the like. The context information may also include additional information about the birthday celebration, including a theme for the birthday party, gift information for the party, and the like. That information may be obtained by the platform via a user interface that the platform may generate and display for user 602A.

Collected context information may be used to unlock, or to enable, additional interaction opportunities for future transactions between the users and platform 100. For example, if the collected context information indicates that user 602A is creating a birthday card for user 602B, then platform 100 may suggest to user 602A to create a memory-based event for his own birthday. In addition, or in alternative, platform 100 may suggest to user 602A to create a memory-based birthday event for any person that user 602A knows, including user 602A himself, user 602B, and the like.

In some embodiments, shared content comprises a shared set of text, image, or color content that all customized products of a group of customized products share, and that can be applied to each customized product of the group of customized products. The shared set of text, image, or color content corresponds to attributes that may be applied to any customized product in the group of customized products. For example, if a user creates an invitation to a family reunion, that then shared content that all products (an invitation card, a reunion-celebration t-shirt, a reunion-celebration polo shirt, a reunion water bottle, and the like) will share may include the name of the family, the date, the location of the reunion celebration, and the like.

The shared set of text, image, or color content may be captured by a plurality of key-value pairs corresponding to shared content attributes shared by customized products of a group of customized products.

The shared content attributes for the group of customized products may be used to automatically build a graphical user interface for the approach for a customized products collaboration video sharing. The graphical user interface may be configured to accept inputs for one or more attributes that are not provided by the shared content attributes.

In some embodiments, shared content attributes for the group of customized products are subject to transformation, translation and constraining for each separate product within the group of the customized products.

7.2. Example Process for Collaborative Sharing

Figure 5:
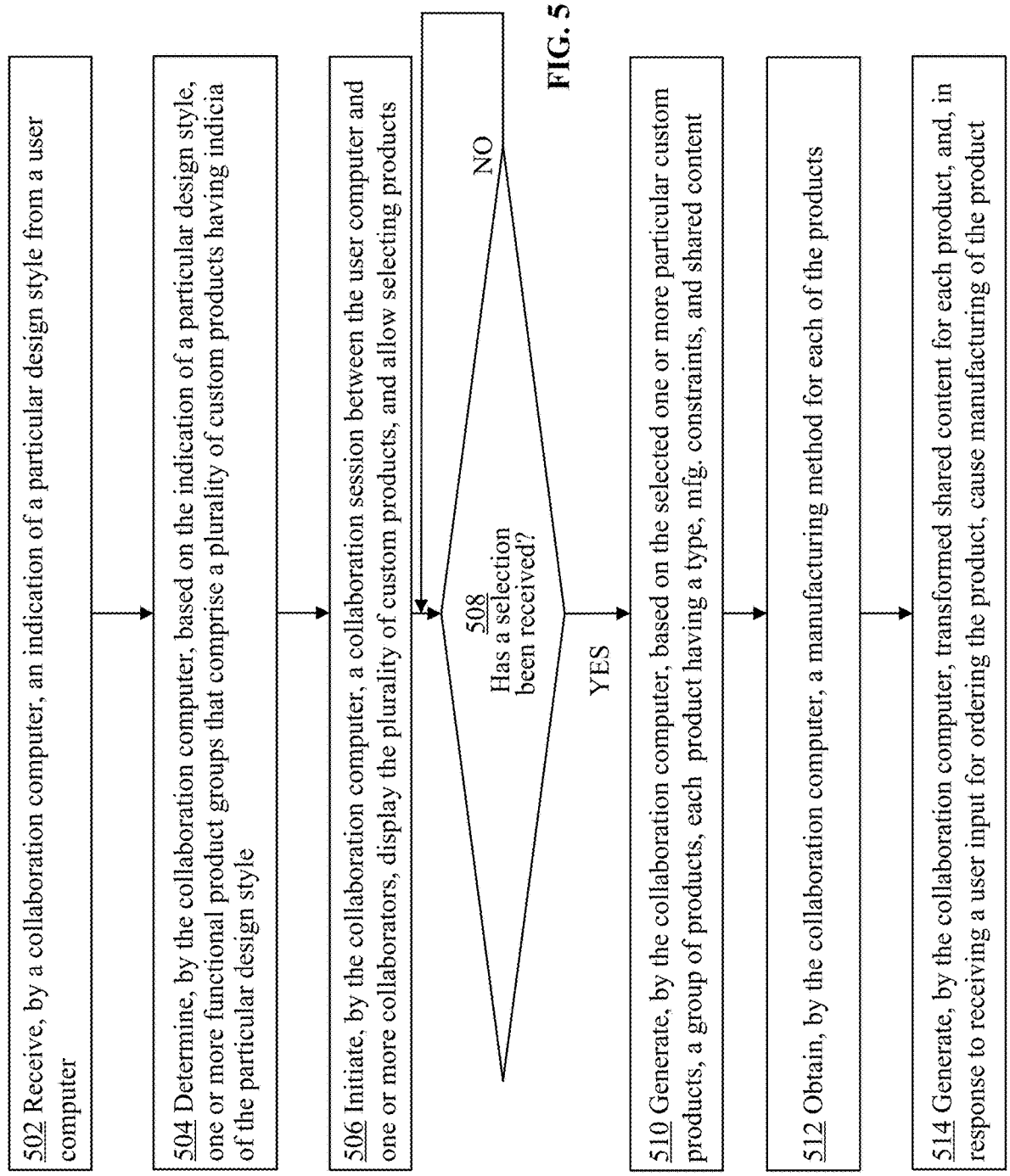
FIG. 5 is a flow diagram showing an example process implementing an approach for collaborative video chat screen sharing using a digital product collaboration platform.

FIG. 5 is a flow diagram showing an example process implementing an approach for collaborative video chat screen sharing using a digital product collaboration platform. In some embodiments, the approach uses the digital product collaboration platform to customize and manufacture a product that meets certain aesthetic preferences. The approach may be executed by collaboration computer platform 100, also referred to herein as a collaboration computer.

In step 502, a collaboration computer receives an indication of a particular design style from a user computer. The indication of a particular design style may be provided via a graphical user interface. The graphical user interface may be configured to allow the user to import images depicting items that conform with the particular design style or to describe the particular design style. The graphical user interface may be arranged as an inspiration board that depicts the images imported by the user, the names of designers, and the like.

Generally, an inspiration board may be a layout of certain kinds of designs, patterns, styles, objects, or items having a particular design style. The inspiration board may provide a design look of a particular design style rather than individual products. The indication of the particular design style may be determined based on one or more of: patterns, colors, or ornamental style of the images imported to the inspiration board. In some embodiments, the graphical user interface is automatically built from shared content attributes for the group of customized products. The graphical user interface may be configured to accept inputs for one or more attributes that are not provided by the shared content attributes. The shared content attributes for the group of customized products may be subject to transformation, translation and constraining for each separate product within the group of the customized products. Customized products in the group of customized products may be segmented based on a type of a customized product in the group of customized products. The customized products in the group of customized products may be segmented based on one or more of: a layout, an image style, or a text content.

In step 504, the collaboration computer determines, based on the indication of a particular design style, one or more functional product groups that comprise a plurality of custom products having indicia of the particular design style. The one or more functional product groups may be generated by the computer collaboration platform by grouping custom products based on certain types of designs, looks or styles. More specifically, a functional product group, of the one or more functional product groups, may include a plurality of custom products that have a certain type of design, look or style. Another functional group may include custom products designed by one or more designers. In some embodiments, a description of the particular design style is provided by a user to the computer collaboration platform via one or more communications channels. The one or more communications channels may include a text chat, a video chat, a phone chat, or a GUI.

Some functional product groups, of the one or more functional product groups, may include tags associated with design aesthetic styles, aesthetic genre, or aesthetic theme, while other functional product groups, of the one or more functional product groups, may include products that are associated with similar aesthetic style. A certain type of design includes one or more of: a certain pattern, a certain color palette, a certain feel, a certain material, a certain texture, a certain finish, or a certain ornamental style.

In step 506, the collaboration computer initiates a collaboration session between the user and one or more collaborators to cause displaying the plurality of custom products on a user device and on collaborators devices, to allow the user and the one or more collaborators to view the plurality of custom products, and to select, from the plurality of custom products, one or more particular custom products. Examples of collaboration sessions include collaboration video chats. The video chats may be used as part of collaborative video chat screen sharing using the collaboration platform.

The user and the one or more collaborators have assigned roles that specify access, privileges and agreements setting forth a type of a collaboration video chat screen sharing. Examples of different roles are described later.

In some embodiments, causing displaying the plurality of custom products on the user device comprises generating a display of the plurality of custom products and presenting the plurality of custom products in a carousel arrangement.

In step 508, the collaboration computer tests whether a selection of one or more particular custom products, from the plurality of custom products, has been received. If it has, then the collaboration computer proceeds to perform step 510. Otherwise, the collaboration computer continues testing in step 508.

In step 510, the collaboration computer generates, in response to receiving a selection of the one or more particular custom products, a group of customized products based on the one or more particular custom products. The group of customized products comprises the one or more particular custom products, each particular customized product is associated with a product type of a plurality of product types, each product type of the plurality of product types is associated with a manufacturing constraint of multiple manufacturing constraints, and each particular customized product has shared content that all of the one or more particular custom products share.

In some embodiments, the shared content comprises a shared set of text, image, or color content that all customized products of the group of customized products share. The shared content is the content that can be applied to each customized product of the group of customized products. The shared set of text, image, or color content corresponds to attributes that may be applied to any customized product in the group of customized products.

In some embodiments, a constraint, from the multiple manufacturing constraints, is specific to a type of a customized product from the group of customized products. The multiple manufacturing constraints may be applied to content attributes of at least two customized products from the group of customized products.

In step 512, the collaboration computer obtains, for a particular customized product from the group of customized products, a manufacturing method for manufacturing the customized particular product. The collaboration computer also determines a product type of the customized particular product and a manufacturing constraint associated with the product type. Also in step 512, the collaboration computer determines, based on, at least in part, the manufacturing constraint, physical constraints, and manufacturing instructions for manufacturing the customized particular product using the manufacturing method.

In step 514, the collaboration computer generates transformed shared content by transforming the shared content, which all of the one or more particular custom products share, to satisfy the physical constraints for manufacturing the customized product. Also in this step, the collaboration computer stores the transformed shared content in association with the group of customized products for manufacturing the customized particular product. Furthermore, the collaboration computer sends, in response to receiving a user input for ordering a custom product, the manufacturing instructions to a manufacturing platform to cause the manufacturing platform to manufacture the customized product.

7.3. Example Process for Manufacturing Products

Figure 6:
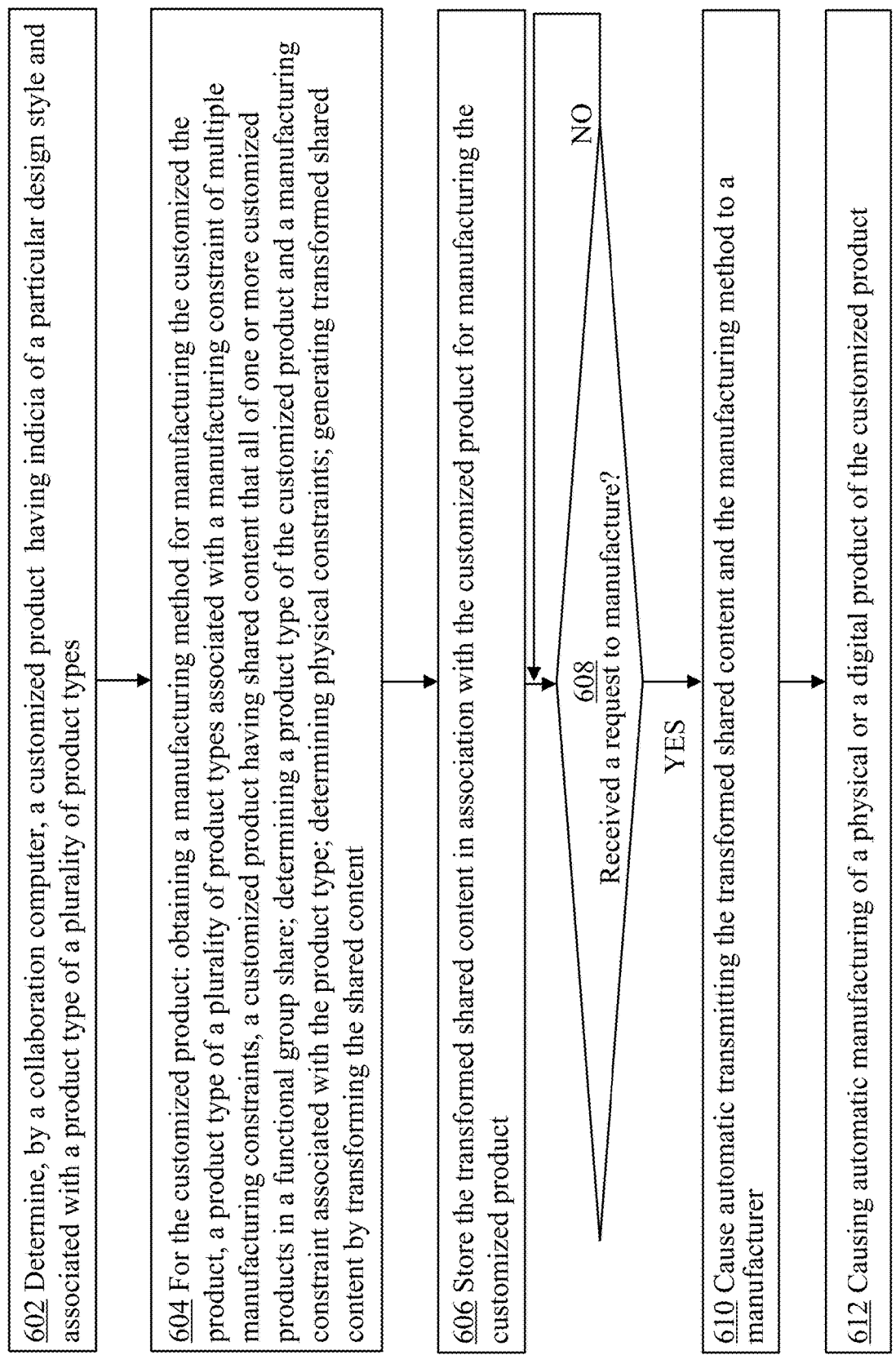
FIG. 6 is a flow diagram showing an example process manufacturing products.

FIG. 6 is a flow diagram showing an example process manufacturing products. In some embodiments, the approach uses the digital product collaboration platform to manufacture a product that meets certain aesthetic preferences. The approach may be executed by collaboration computer platform 100, also referred to herein as a collaboration computer.

In step 602, a product collaboration computer determines a customized product that has indicia of a particular design style. The indicia may be provided in a form of, for example, an inspiration board. Examples of inspiration boards were described before.

Typically, the customized product is associated with a product type of a plurality of product types. The product type of the plurality of product types is associated with a manufacturing constraint of multiple manufacturing constraints. The customized product has shared content that all of the customized products in a functional group of products share. For example, if a user creates an invitation to a baby shower, then shared content that all products (invitation cards, party-celebration t-shirts, party-celebration polo shirts, party water bottles, and the like) may share the name of the baby, the date of the baby shower, the location of the party celebration, and the like. The shared content was described in detail before.

In step 604, for the customized product, the collaboration computer obtains a manufacturing method for manufacturing the customized product. Details about the manufacturing method were described before.

Also in this step, the product collaboration computer determines a product type of the customized product and a manufacturing constraint associated with the product type. The manufacturing constraints were described before.

Based on, at least in part, the manufacturing constraint, the collaboration computer determines physical constraints for manufacturing the customized product using the manufacturing method.

Also in this step, the collaboration computer generates transformed shared content by transforming the shared content, which all of the one or more customized products share, to satisfy the physical constraints for manufacturing the customized product. Examples of shared content were described before.

In step 606, the collaboration computer stores the transformed shared content in association with the customized product.

In step 608, the collaboration computer tests whether a request for manufacturing the customized product has been received from a user. The request may be provided via a GUI, via a function button, via a sensor, and the like.

If the request is received, then the collaboration computer proceeds to performing step 610. Otherwise, the collaboration computer awaits the input in step 608.

In step 610, in response to receiving the request, the collaboration computer causes it to automatically transmit the transformed shared content of the customized product and the manufacturing method to a manufacturer. Depending on the received request, manufacturing of the product may include generating a digital customized product or a physical customized product.

In step 612, the collaboration computer causes a manufacturer to automatically manufacture a physical or a digital product, or both. That decision depends on the received request. For example, if the user is customizing wedding invitations, the user may want to order both the physical wedding invitations and the digital wedding invitations. However, if the user is ordering a customized mug, then most likely, the user would order a physical customized mug.

8. Example of Generating Customized Products 8.1. Collaboration

Figure 3:
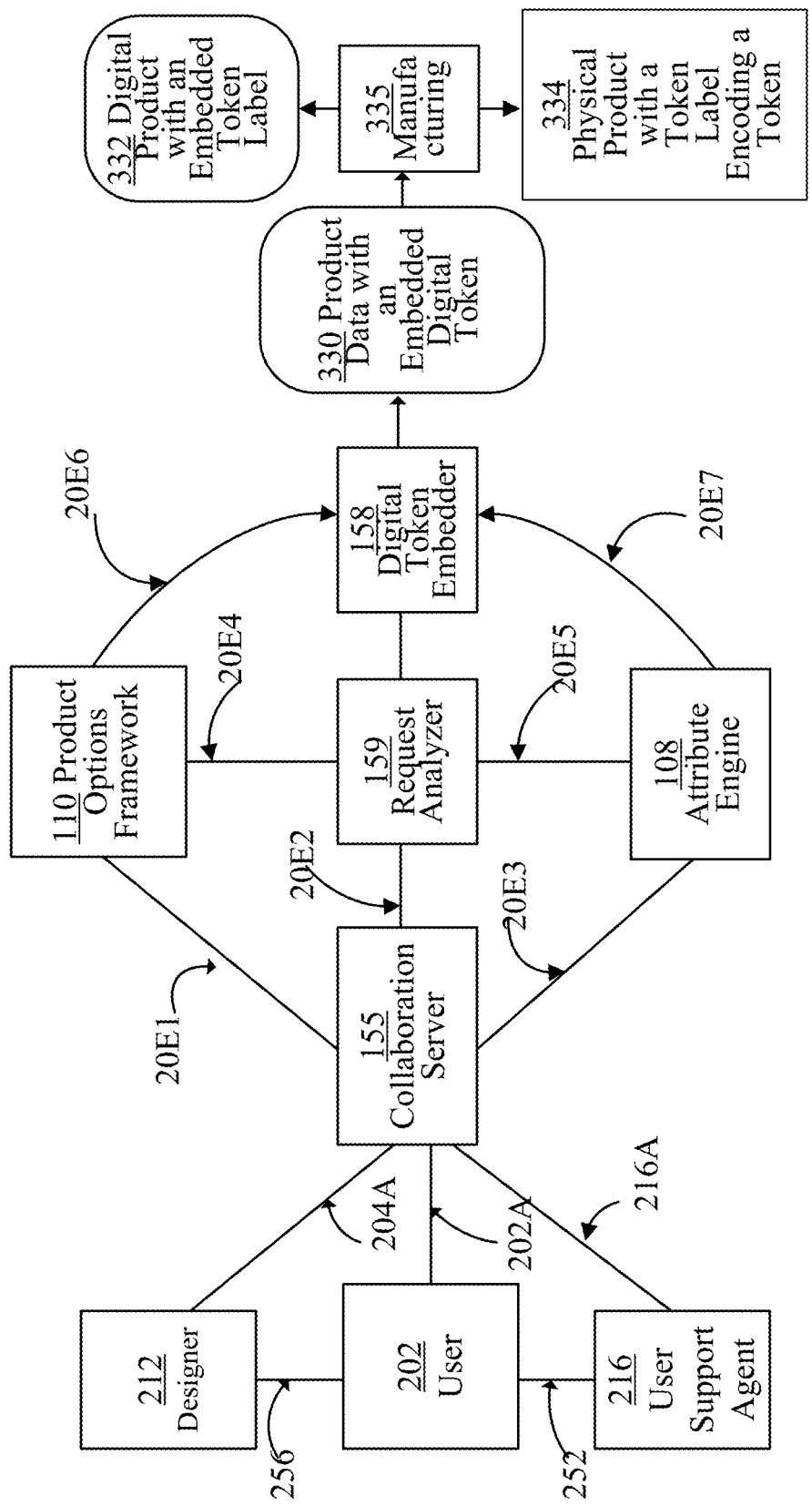
FIG. 3 is a block diagram showing a collaboration example implemented in a product collaboration platform

FIG. 3 is a block diagram showing a collaboration example implemented in a product collaboration platform. In the depicted example, a user 202 collaborates with a designer 212 and/or a user support agent 216. The roles of individuals 202, 212 and 216 and the different ways of collaborating are described in detail in FIG. 8. In other examples, user 202 may contemporaneously collaborate with several peers, several support agents, and/or several designers.

In FIG. 3, user 202 communicates with designer 212 via a communications session established along link 256 and communicates with user support agent 216 via a communications session established along link 252. The data communicated by designer 212 are transmitted to collaboration server 155 via a link 204A; the data communicated by user 202 are transmitted to collaboration server 155 via a link 202A; and the data communicated by agent 216 are transmitted to collaboration server 155 via a link 216A.

In some embodiments, monitoring system 156 of collaboration server 155 intercepts a data stream exchanged along link 256 and/or intercepts a data stream exchanged along link 252. Collaboration server 155 may cooperate with product options framework 110 and transmit (20E1) data to product options framework 110. Collaboration server 155 may also collaborate with attribute engine 108 and transmit (20E3) data to collaboration server 155.

Furthermore, collaboration server 155 may cooperate with request analyzer 159 and transmit (20E2) a request made by user 202 for, for example, assistance from designer 212 (or agent 216), to request analyzer 159.

In some embodiments, request analyzer 159 may request and receive (20E4) the data from product options framework 110. Furthermore, request analyzer 159 may request and receive (20E5) the data from attribute engine 108. Request analyzer 159 may also request information from designer database 562, designs database 564, and the like. Processing of the request is described in detail later.

Collaboration server 155, product option framework 110, attribute engine 108 and request analyzer 159 may cooperate with each other. This may include journaling a plurality of key-value pairs generated during the interactive session during which designer 212, user 202 and user support agent 216 create the interactive digital design. This may also include transforming ownership and license agreements, embedded in the plurality of key-value pairs journaled during a collaboration session, into, for example, a graph-network and then into an ownership-agreement tree. This may also include evaluating the ownership-agreement tree with respect to communications channels 256 and 252, established between user 202, designer 212 and user support agent 216, respectively to determine whether any communications between any users 202, 204 and 216 violated any constraints included in the ownership-agreement tree.

Collaboration server 155, product option framework 110, attribute engine 108 and request analyzer 159 may also cooperate with each other when a request for ordering, for example, a physical product corresponding to the interactive digital design is received. In response to receiving the request, collaboration server 155, product option framework 110, attribute engine 108 and request analyzer 159 may collaborate to generate, determine, or retrieve, a token 330 that represents a plurality of key-value pairs for the interactive design.

In some embodiments, digital token 330, capturing a plurality of key-value pairs for the product, may be stored at a location in a storage unit. The location may be identified using a hyperlink or a UUID, described before. The generating of the token and storing of the token may be performed by, for example, a code embedder 158, depicted in FIG. 2.

In some embodiments, the hyperlink pointing to the location at which the plurality of key-value pairs is stored, or the UUID, is communicating to a manufacturing server 335. Manufacturing server 335 may retrieve, based on the hyperlink or the UUID, the plurality of the key-value pairs, and translate the pairs into, for example, manufacturing instructions for manufacturing an actual product. Then, manufacturing server 335 may use the manufacturing instructions to manufacture, based on the key-value pairs, an actual product. Depending on the manufacturing instructions, the actual product may be either a digital product 332 or a physical product 334.

Digital product 332 may be a digital greeting card, a digital invitation, or the like. Physical product 334 may be a physical water bottle, a physical mug, or the like.

In some embodiments, manufacturing server 335 generates a token that captures token data and describes how a user may request services related to the manufactured product, and how to access a product customization platform. The token, i.e., token digital data, may be encoded in a token label.

In some embodiments, if the actual product is digital product 332, then a token label is a token digital label pasted into an image of digital product 332. However, if the actual product is physical product 334, then a token label is a token physical label attached to the physical product 334.

8.2. Example of Generalization of Custom Product Options Key-Value Pairs Based on Grouping by Event Many custom products share similar modifiable attributes. The product attributes may be represented as key-value pairs that describe how the products may be manufactured within certain physical constraints. For example, an invitation, a t-shirt, and a luggage tag may be manufactured (printed, sublimated, or engraved) with text. In each case, there are constraints imposed by each manufacturing process such as the size and line quality of the text, the length of the text, the available fonts, and styles. While the products may have different manufacturing constraints, they may all be included in a product group for a specific event, such as a family reunion. In this product group, each of the products may have product attributes represented as key-value pairs that specify, for example, the name of the reunion, the date, and the location. It is useful for a customization system to encode the shared portion of the attribute, such as the name of the family reunion, while preserving the constraints imposed by the entire group.

8.2.1. Text, Image, Substrate Color and Trim Color Attributes

In some situations, certain attributes may correspond to manufacturing constraint attributes. For example, there may be a relationship between text, image, substrate color, and trim color attributes and the corresponding manufacturing constraint attributes.

Examples of manufacturing constraints for different product types may be described in reference to groups of the product types. Examples of product types may include invitations, t-shirts, polo shirts, water bottles, totes, and the like.

Manufacturing constraints for invitations (printed by HP Indigo for instance) may include, for example, 600 ppi, process color, white base possible, foil sleeking, text imaged as Postscript fonts. fixed sizes, large number of paper types as substrate, unlimited trim color, and the like.

Manufacturing constraints for t-shirts screen print may include, for example, 90 ppi, text imaged as stencil, indexed/custom palette, opaque, max 1 point line size, limited font size, relatively small number of substrate types, relatively small number of trim colors and the like.

Manufacturing constraints for polo shirts with embroidery may include, for example, low resolution, custom fonts, text as stitch, image conversion, indexed/custom palette, relatively small number of substrate types, relatively small number of trim colors.

Manufacturing constraints for water bottles (with inkjet sublimation) may include, for example, 600 ppi, text imaged as raster, dye color gamut, transparent, relatively small number of substrate colors, relatively small number of trim colors.

Manufacturing constraints for nylon totes (with a thermal print/cut transfer) may include, for example, 600 ppi, text imaged as raster, outlined as vector, cut boundaries with point size limit, limit on negative areas, relatively small number of substrate colors, relatively small number of trim colors, reference pattern.

In some embodiments, constraints may be applied to content attributes. Usually, text length and size may be constrained differently for different products. For example, in case of an embroidered polo shirt compared to an HP Indigo printed invitation, less text may fit in a design area for a polo shirt, font choices may be limited to embroidery fonts, text color may be limited to the palette of thread colors, the number of text colors may be limited by the capacity of the embroidery machine.

In case of an image, the form and the style of an image may be constrained differently for different products. For example, an image boundary may be constrained for a nylon tote using thermal print/cut transfer, the image may need to be translated into a stitched embroidery for the polo shirt, which imposes limits on color, line width, and textural quality of the image.

Furthermore, the image may need to be transparent, but may have a large color gamut for a water bottle using inkjet sublimation. Moreover, an image may have a high-resolution and may support white opacities and foil sleeking for an invitation using HP's Indigo process. Further, an image may need to be constrained in color and resolution for a screen printing.

In case of a substrate color, different products may have specific available substrates, which may vary greatly in color from each other.

In case of a trim color, different products may have specific available trim colors, which may vary greatly in color from each other.

8.2.2. Segmentation of Product Types by Intended Function

Typically, layout, content form and meaning may vary greatly between products with the same substrate/manufacturing. Examples of layouts may include a wedding invitation layout, a 3 year old birthday invitation layout, a graduation invitation layout, and the like. Subsequently, the image style and text content may have different social agreements for specific functions for products with the same substrate/manufacturing. For example, the image style and content for a t-shirt for a child's soccer team may be different from the image style and content for a St. Patrick's Day t-shirt.

However, segmentation of products by similar content attributes, layout, and style provides many advantages. For example, user interface options may be focused, smaller, more salient. Furthermore, transformation of content attributes from one product to another may be simplified. Moreover, the mapping of similar content attributes to one another may be easier.

Usually, default settings for product content attributes may not need to be edited. This allows designers to apply their own default setting for a product segment. This also allows users to choose products that are more finished or complete.

There are usually many methods for segmenting products by function. One method includes a segmentation by k-means clustering. According to that method, products may be automatically segmented by k-means clustering based on similarities in the keys used for the product's set of content attribute's key-value pairs.

According to another method, segmentation is performed by user selection/editing of attributes. In this method, products may be automatically segmented by user's choice of content imagery, text, or color, through similarities in the value used for the product's set of content attribute's key-value pairs.

According to other methods, the segmentation is performed based on a market segment. In this method, a manual and automated segmentation of product types discovered through analysis of user transactions is performed.

Yet another method includes segmentation based on products designed for an intended function. In this method, a manual and automated segmentation of product types discovered through analysis of designed products is performed. For example, designers may create content attributes by building text fields, image areas, color areas in a design tool, and assign them as the defaults for a custom product. Furthermore, designers may assign search terms to label and typify an instance of a particular product. A set of designed products with similar product search terms, and similar content attributes may be discovered through automated k-means clustering, and/or filtered manually, or other automated segmentation, to create a new functional product.

8.2.3. Shared Text, Image, Substrate Color, and Trim Color Attributes Across Product Types Content attributes with similar keys and similar product functions may be shared. For instance, many products may have a time or date associated with them; the date field may be shared between products. Further, many products may have the recipient's name or monogram associated with them, and that name of monogram may be shared between multiple products. Moreover, many products may have a logo, crest or graphic mark or symbol associated with them, and that graphic mark may be shared between multiple products. In addition, many products may have a color palette or color scheme associated with them. These colors for substrate and/or trim may be shared between multiple products.

8.2.4. Content Defaults for Shared Text, Image, Substrate Color, and Trim Color Attributes In addition to default content values being assigned to a product instance by a designer, a set of product instances may be grouped together to form a product for a specific function, and commonly shared content attributes may be assigned default values for ease in describing and/or editing a product. Further, the content attribute defaults may be changed and applied by a user, designer, or other agent to be specific to a given person, function, or use.

8.2.5. Product Grouping by Function and Use

Individual products that serve a shared function may be grouped together. For instance, many manufactured products may be useful as functional products for a given use such as decoration of a kitchen/dining room area. Products used in this area of the home may have design and ornamentation that are harmonious and are a good fit for the user's design sensibility. These products in this group may include, but are not limited to, wall decorations (such as prints, photos, calendars, printed textiles, wallpaper), serving ware (bowls, plates, pans, cutting boards, utensils), accessories (cushions, placemats, pillows), floor coverings, and the like.

Many products in this functional group may have a product description that includes a key-value pair for a substrate type or color. These substrate colors may be set using a palette of colors derived from the user's choices and modifications in an inspiration board. For instance, if the user's inspiration board contains a set of images, products (including their full set of product options) that, when processed, produce a palette of harmonious earth tones, the products in the functional product grouping by "decoration of a kitchen/dining room area" may have their substrate key-value set modified to present the best match for the user's color palette. Additionally, when first presented to the user, the functional product group may have presets that are known to be harmonious selections for the user's palette.

Many products in this functional group may have a product description that includes a key-value pair for a primary design area or decoration. For instance, wall decorations, cutting boards, cushions, pillows, and placemats may have a primary design area. These decorations may be set using patterns and imagery matching or similar to the user's choices and modifications in an inspiration board. For instance, if the user's inspiration board contains a set of designs and images containing floral designs, a set of these designs may be transformed and applied to each product's key-value pair for a primary design area or decoration. Additional designs may be associated with the user's choices in their inspiration board by the system. This may be performed by several methods, it may be done by comparing image elements between designs and selecting those that are most similar in color, texture, content and pattern. This may be done by selecting designs which have been tagged by skilled designers with a specific design category, by comparing other inspiration boards with the user's inspiration board and selecting designs which are a similar match.

Many products in this functional group may have a product description that includes a key-value pair for a trim color or material. These may be set by using complementary colors to those selected for the key-value pair for a substrate type or color. These complementary colors may be set using one of several automated methods: They may be set by an algorithm using a color theory such as (but not limited to) finding a color from the user's palette where the hue in HSV color space is 120 degrees distant from the hue of the substrate color, the saturation is 20% or more degrees greater than the saturation of the substrate color, and the value is 20% or more distant from the value of the substrate color. They may be set by selecting from a color set designed by a skilled designer that associates a trim color with a substrate color. They may be set by traversing the set of products in the user's inspiration board, or the inspiration board of a similar user, and finding a product with a similar substrate type or color, and choosing the associated setting for the trim color or material.

Many products in this functional group may have an overall design or form that fits a particular design style. For instance, a wooden serving spoon may have a simple spare design, or it may be ornate in its carving. The shape and design of a specific product may serve as a means to place it within one functional group or another.

8.2.6. Design Form and Style as A's Product Function Group

The function of a custom product may be, in addition to its use as a tool, accessory, or other convenience, serve to decorate, ornament, color, and enliven a place or an activity. It is useful to group products and their customizable properties to produce a pleasing effect when used together. As mentioned above, it is possible to build such groupings based on intended use (decoration of a place or activity), by a product's overall design or form, and by the ability to set the product options of each grouped product with a specific design sensibility as determined by a user's inspiration board.

8.2.7. Social Events as Product Function Group

The function of a custom product may be used to celebrate or memorialize a social event. Examples of the common social events and their main content attributes include wedding, birthdays, anniversaries, graduations, engagements, and holidays.

Examples of content attributes for wedding events may include the names of a bride and the groom, the names of the parents of the bride, the names of the parents of the groom, the names of the bride's maids, the names of the groom's men, the names of the attendees, the date, the information about a reception, a color theme, a graphic device, a nature scene, a portrait of the couple, and the like.

Examples of content attributes for holiday events may include Christmas, Hanukkah, Halloween, Easter, Passover, New Year, Yom Kippur, and the like.

8.2.8. User Interface Construction for Product Attributes by Functional Groups

User interface may be automatically built from shared content attributes for a function group. Building the user interface that way provides many benefits. For example, it reduces complexity of user interaction. It also applies to multiple products, rather than one at a time. It allows collecting only the information that is needed for the function, and it allows relying on the designer defaults to reduce complexity.

8.2.9. System for Managing Manufacturing Constraints

Different products within the functional product group may have different constraints. However, specific content attributes may be transformed, translated, or constrained for each product within the group. Hence, a key novelty of the collaboration system is the methods of managing manufacturing constraints for separate products that share the same content attributes.

Examples of the methods for applying constraints depend on whether the constraints pertain to text, image, or substrate color. For the text, the system will adjust a text size and placement to retain perceptual importance. Furthermore, the system will substitute text fonts as needed, based on similarity. A short form and a long form text fields may be used to meet the text size limits. Some text content may be dropped based on layout fill. These transformations may be implemented as a rule based automated algorithm, a user guided choice, a designer guided choice, an agent guided choice, or a TensorFlow guided choice based on the corpus of the designer and agent guided choice.

For the methods for applying constraints to images, the system may adjust color space constraints based on methods described in referenced patents. Furthermore, the system may apply image translation to embroidery files based on methods described in referenced patents. Moreover, the system will apply screen printing constraints based on the methods described in the referenced patents. In addition, the system may apply thermal transfer constraints based on the methods described in the referenced patents. The system may also apply thermal print transfer constraints based on the methods described in the referenced patents.

For the methods for applying constraints to substrate color, the system may choose substrate color by transforming the color content attributes. The transformations may be implemented as a rule based automated algorithm, a user guided choice, a designer guided choice, an agent guided choice, a TensorFlow guided choice based on the corpus of the designer and agent guided choice, and the like.

9. Key-Value Pairs

In some embodiments, a customized product, created using the functionalities of a product collaboration platform, is defined in associated product description data. Product description data for an interactive design may include data that digitally captures the characteristics and parameters of the interactive design. The product description data may be used to manufacture the customized product corresponding to the interactive design. The product description data may be also used to generate a graphical visual representation of the interactive design that is capable of custom manufacture with a plurality of variable product attributes. Typically, the product description data may be parsed by a collaboration server to identify a plurality of global-key-values pairs that are journaled within the product description data for a plurality of contributors.

A global-key-values pair usually includes a key and a value associated with the key. The global-key-values pair is referred to as global because it is global to a current collaboration session. While the key has a persistent meaning across all transactions, the value is scoped to a specific collaboration session. Furthermore, all global-key-values pairs created and modified during a particular collaboration session are journaled and saved for that particular collaboration session.

Based on, at least in part, the plurality of global-key-values pairs, an ownership-attribution tree may be constructed. Based on, at least in part, the ownership-attribution tree, manufacturing instructions for customizing the physical product and according to the plurality of variable product attributes may be generated. The manufacturing instructions may be transmitted to a product customization server to cause a manufacturing entity to proceed with generating a customized product based on the manufacturing instructions.

Examples of global-key-values pairs may include: an age restriction key-value that includes an age restriction key and an age value; a content lock key-value that includes a content lock key and a content lock key value; a blacklist key-value that includes a blacklist key and a blacklist; a whitelist key-value that includes a whitelist key and a whitelist; an ownership key-value that includes an ownership key and a user universally unique identifier (user ID); a copyright key-value that includes a copyright key and a user ID; a license key-value that includes a license key and a universally unique identifier for a specific license agreement held between an owner or a primary designer and a computer collaboration server; a user support key-value that includes a support key and a support agent contract identifier; and an attribution key-value that includes an attribution key and a universally unique identifier that references a set of software instructions for manufacturing to apply a marking on a product as may be directed by copyright or licensing agreements. Other global-key-values, such as key-values that are specific to an implementation or a line of products, may also be implemented.

In some embodiments, the product description data for the interactive design is generated as one or more modifications to the interactive design are received from one or more user interfaces and are used to update the interactive design.

A plurality of global-key-values pairs journaled within the product description data are originated when a customization session for customizing the interactive design is initiated. The plurality of global-key-values pairs may be updated each time when a contributor, who has been granted a valid license and who participates in the customization session, provides modifications to the interactive design. The plurality of global-key-values pairs may carry license agreement information and restriction information specific to the customization session and the interactive design.

In some embodiments, upon detecting that no further modifications for the interactive design are provided, the plurality of global-key-values pairs journaled within the product description data are stored in a global-key-values database.

10. Collaboration Examples

Digital product collaboration platform 100, shown in FIG. 2, may support a variety of collaboration sessions. The collaboration session may be established between two or more users. The types of collaboration sessions may depend on the roles that are assigned to the users who participate in the sessions. For example, a user may collaborate with a user support agent, engage in a creative work with a graphic designer, ask an agent or a designer for help in modifying a custom product template, collaborate with the user's peers, watch a designer create a design in real time, watch a designer demonstrate how to create a design offline, watch a preview of how to create a specific custom product, and/or watch an edited set of journaled actions performed by a graphics artist to learn how to solve a specific design problem.

10.1. User-Designer Collaboration

A user may collaborate with a designer, also referred to as a live designer or an agent. For example, a user may ask for assistance from a designer to help the user to customize an interactive design and show the user how the designer would modify the interactive design to achieve the design that the user would like to see.

Examples of collaboration sessions between a user and a designer may include situations when a user is exploring a product web page in a marketplace site and needs help tweaking the design, such as a party invitation, a mug design, and the like. Another example may include a situation when a user is exploring a product web page in a marketplace site depicting a picture of a mug and wants to tweak the design. Other examples may include a situation when a user found an interesting design of a wedding invitation, a holiday card, a custom blanket, or the like, but does not know how to modify the design. In some other situations, a user wants to contact a user service or call a help desk and ask for assistance in using the collaboration tools.

10.2. Sharing Access to Product Description Data

Customization of an interactive design in collaboration between a user and a live designer may include creating the design and modifying the design by both the user and the designer. To be able to customize the design, the user and the designer may share access to product description data associated with the design.

In some embodiments, to be able to collaborate on an interactive design with a graphics designer, a user may request a collaboration session between the user and the designer and be supported by a collaboration platform. Once the session is established, the user and the designer may share access to product description data that are associated with the interactive design and that include corresponding key-value pairs.

A collaboration session may support a communications session between the user and the designer, a modification session for modifying an interactive design by the user, a modification session for modifying the interactive design by the designer, and the like. The sessions may be merged into one collaboration session.

A modification session for modifying an interactive design may be established for each user, designer, agent, and the like.

To initiate a modification session for a user, a computer collaboration system may generate a user interface for the user. The interface may be generated based on, at least in part, information stored in a user profile. That information may include information indicating the user's role. The user interface may include the functionalities that are specific to the user, and that allow the user to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

In some embodiments, the computer collaboration system causes displaying, in a user interface executing in a user device of the user, an interactive design along with annotations representing attributes, attribute groups and the locations within the design to which the attributes apply. The attributes, default values for the attributes and default ranges for the values for the attributes may be provided by an attribute engine which may be part of the computer collaboration system. The attribute engine may define and/or filter the attributes according to constraints provided by manufacturers, designers, or system administrators.

In response to receiving, in the user interface, a rendering of the interactive design with the annotations, a user may select, using the functionalities of the user interface, a specific attribute or a specific attribute group at a specific location within the depiction of the interactive design and select or adjust a value associated with the attribute. For example, the user may select a width-attribute and use a slider object, provided by the user interface, to set a new value for the width parameter. The new value of the parameter may be transmitted as a serialized key-value pair to a product options framework.

In response to receiving, in the user interface, the user may also request assistance from the designer. If a user requests assistance from a designer, a collaboration platform may allow the user and the designer to share access to the product description data that are associated with the interactive design and that include the corresponding key-value pairs. For example, upon receiving the request, the platform may initiate a modification session for the designer and may generate a user interface for the designer. The interface may be generated based on, at least in part, information stored in a designer profile. That information may include information indicating the designer's role. The user interface may include the functionalities that are specific to the designer, and that allow the designer to collaborate with others, modify the attributes of an interactive design, store the modifications in a product description associated with the interactive design, store the modifications in a journaled list of modifications for the interactive design, prune and reorder the journaled list, and publish the rendering of the modified interactive design.

The collaboration platform may allow either the user or the design access the product description data, or both. However, the switching between the access may be implemented each time either the user or the designer requests the access to the product description data.

The switching between the access may be performed multiple times, usually until the user and the designer are satisfied with the resulting interactive design or until they decide to terminate the collaboration session. At that time, serialized key-value pairs for the interactive design at a location on a server or in a cloud system are stored and a hyperlink to the location where the pairs are stored is created. Upon receiving a serialized key-value pair, the product options framework may store the serialized key-value pair in a journaled list of modifications for the interactive design.

Upon receiving a request to view the Journaled list from the user, the attribute engine may provide the Journaled list to the user interface executing on the user device and cause the user interface to display the journal list. At that point, the user may review the modifications included in the journaled list, reorder the modifications included in the list, remove some modifications from the list and/or request applying of the modifications included in the list to the interactive object. The user may also request generating a rendering of the current interactive design. If the rendering of the current interactive design is completed, the user may view the rendering in any of a plurality of available views.

In some embodiments, the user may accept the rendered depiction of the modified design and request that the customized design be sent to a manufacturer or a distributor. Then the user may place an order for an actual product that is based on the customized design provided to the manufacturer or distributor.

11. Role-Based Collaboration Platform

11.1. Role-Based Collaboration

Referring again to FIG. 2, digital product collaboration platform 100 is provided herein to illustrate clear examples and should not be considered as limiting in any way. Other computer collaboration systems may include additional components such as computer servers, various input/output devices, and additional software and/or hardware components that are not depicted in FIG. 2. Other computer collaboration systems may be implemented in cloud-based systems, distributed computer networks, and the like. Other computer collaboration systems may include fewer components than example digital product collaboration platform 100 shown in FIG. 2.

11.2. User Roles

Various roles may be assigned to users who interact with digital product collaboration platform 100 via user devices 140A-140G. Examples of roles may include a user role, a user support agent role, a graphics designer role, a user peer role, and a user product artist role. Based on the assigned roles, the users may be granted access to a product description of an interactive design as editors, viewers, managers, and the like.

A user role may be assigned to a user who is a user and who wants to customize one or more interactive designs offered by platform 100. A user may, for example, edit/modify attributes of an interactive object, view a rendering of the customized design, publish the customized design, request that another user (a designer or a user support agent) modify the interactive design according to the users' description, request a list of modifications that the user proposed for the interactive design, and/or delete or revert some of the modifications included in the list.

A user support agent role may be assigned to a user who may assist other users in customizing an interactive design. A user support agent may, for example, help in modifying the interactive design, provide various views of the rendered design, publish the rendered design on behalf of the user, and the like.

A graphics designer role may be assigned to a user who may assist in defining attributes for an interactive design, defining default values for the attributes for the design, defining ranges of the values for the attributes for the design, and/or customizing the interactive design. For example, a graphics designer may define a set of attribute-default values pairs and store the pairs in product data definitions 104. A graphics designer may also define a set of roles that may be assigned to the users and store the set of roles in user profiles 102.

A user peer role may be assigned to a user who may view an interactive design customized by someone else. A user peer may, for example, view the interactive design and provide comments or feedback on the design to the user. A user peer may be granted access to a product description for the customized design, and in some embodiments, may modify the attributes associated with the design.

A user product artist role may be assigned to a user who may provide tutorials and online help in customizing interactive designs. A user product artist may define attributes for the designs, determine default values for the attributes, determine ranges of values for the attributes, determine the roles for the user who may be allowed to customize the interactive designs, and/or demonstrate how to use the customization functionalities.

Figure 7:
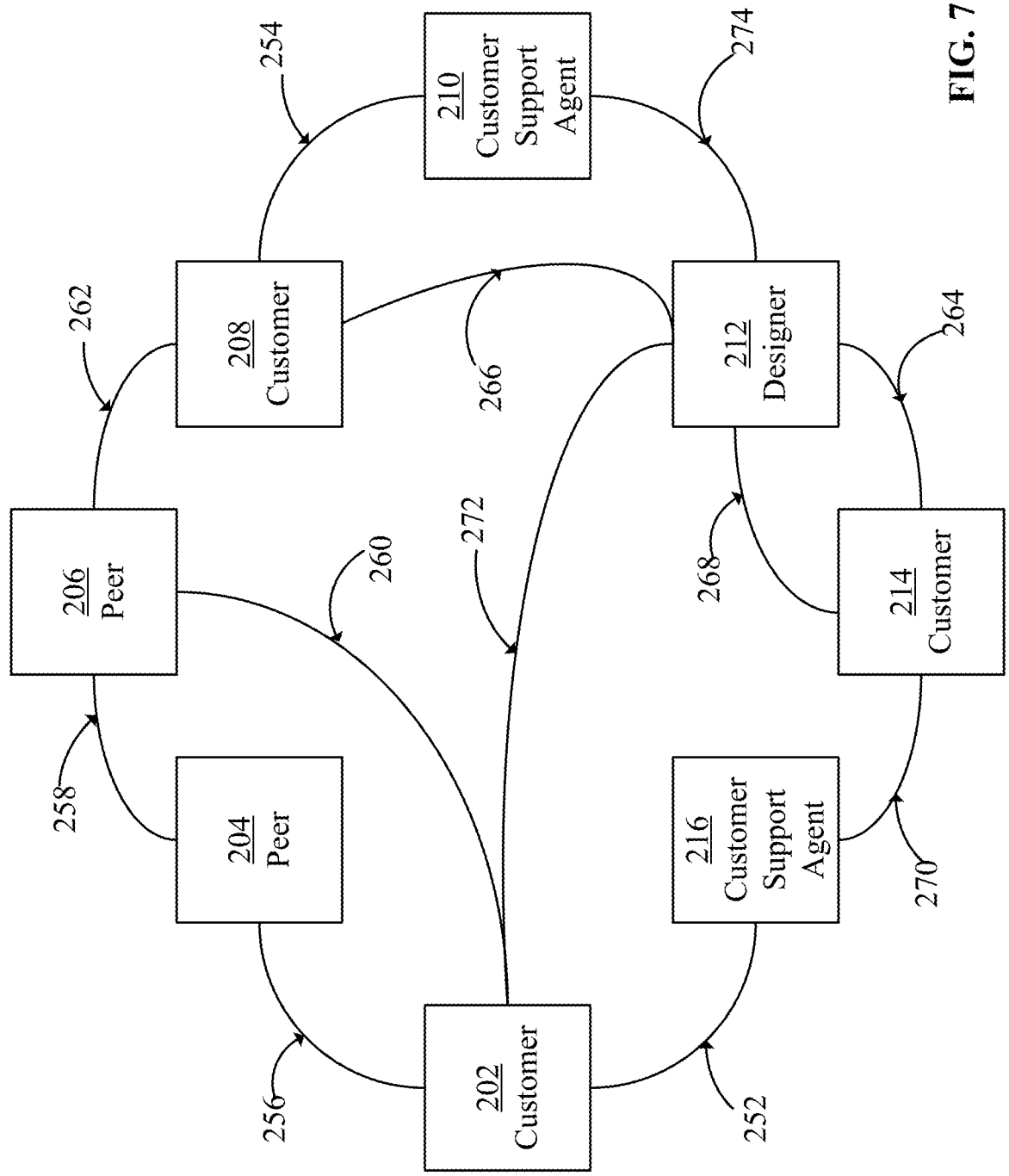
FIG. 7 is a block diagram showing examples of roles in a product collaboration platform.

FIG. 7 is a block diagram showing examples of roles in a product collaboration platform. In FIG. 7, examples of user-agent collaboration sessions include a session 252 between a user 202 and a user support agent 216, a session 254 between a user 208 and a user support agent 210, a session 264 between a user 214 and a designer 212, a session 266 between user 208 and designer 212, a session 268 between a user 214 and a designer 212, a session 270 between a user 214 and user support agent 216, and a session 272 between user 202 and designer 212.

In some embodiment, a user may use email, text, phone, and any other type of communications to describe to a user support agent the design that the user would like to achieve. Once the user explains to the agent the desired design, the user may select, from his user interface, a user interface element that would allow setting an editor role to the agent so that the agent could edit the interactive digital design for the user. This would include granting the agent access to a product description associated with an interactive digital design as an editor.

In response to that, the agent may be provided with an updated user interface or a new user interface that would allow the agent to modify the interactive digital design. For example, the agent could select, from his user interface, a location-based attribute (or a group of attributes) and modify a value associated with the attribute, select another attribute, and modify it, and so forth. Each modification may be automatically saved as a serialized key-value pair, and this solves the technical problem of navigating through countless sets of attributes and dealing with, for example, countless clicks to complete the customization as required in conventional customization platforms. The pairs may be transmitted to a product options framework, which would update the product description for the interactive digital design. Then, a product options framework may render a modified depiction of the interactive digital design and propagate the rendering to the user computers for rendering in the corresponding user interfaces.

11.3. User Profiles

Referring again to FIG. 2, digital product collaboration platform 100 may include one or more storage devices for storing user profiles database 102. User profiles database 102 may be used to store information indicating roles assigned to individual users, access codes or keys assigned to the users, identifiers and passwords assigned to the users, and the like.

11.4. Product Definitions

Digital product collaboration platform 100 may further include one or more storage devices for storing product data definitions database 104. Product data definitions database 104 may include product descriptions of one or more interactive designs that are offered by digital product collaboration platform 100. A product description of an interactive design may include, for example, a global-key-values set, a set of attributes that are associated with the design, and default values that may be assigned to the attributes of the design.

11.5. Attribute Representations

Collaboration components 106 may include a component that is used to store a representation of attributes of an interactive design. The attributes may correspond to characteristics of the products and may be selected or provided by manufacturers of the products. The attributes may have assigned default values and the default values may be assigned either by the manufacturers, system administrators managing digital product collaboration platform 100 or platform 10, or artistic designers, as described earlier.

Descriptions of the attributes for each interactive design, or groups of designs, may be stored as part of collaboration components 106 or in a separate data structure that may be organized as a data table or storage space that is accessible to collaboration components 106. The descriptions of the attributes and values of the attributes associated with the products may be provided and/or requested by other components of digital product collaboration platform 100, such as a product options framework 110, which is described later.

For each interactive design available for customization using platform 100, default values of the attributes associated with the product may be modified by users according to the roles assigned to the users and according to the manufacturing constraints provided by a manufacturer. For example, if a customized product is a t-shirt, its default color may be red, but a user may modify the color by selecting any of three colors (e.g., red, green, or blue) to the t-shirt. The modification may be stored in, for example, product data definitions 104.

An interactive design can be defined as the subset of the custom product attributes that may be altered, added, manufactured, or embellished for the purpose of custom product manufacturing. While the product attributes are product specific, they may include the substrate color or material choice for an area of the product, the trim material or color of a product, printed, engraved, or embroidered embellishments, and/or color palettes applied to the design.

Attribute definitions and types, as well as default values for the attributes of an interactive design, may be provided by a manufacturer or a designer of the design. The attributes and default values may be changed by the users according to, for example, the roles assigned to the users. For example, a user who is assigned a role of an artistic designer may be allowed to edit/modify the attributes associated with the design, edit the default values of the attributes, as well as edit the ranges of the values that may be assigned to the attributes.

Suppose that an interactive design is a mug. Then an artistic designer may define several attributes for the mug and define default values for the attributes. The attributes may include a color, a size, a label, and an ornamental design imprinted on the mug. The default values for the attributes may include red for the color, large for the size, hello for the label, and white stripes for the ornamental design. The artistic designer may also define that a user may modify the color of the mug by selecting either red or blue and may modify the size of the mug by selecting either large or small.

In some embodiments, a product description may include, or be associated with, a journaled list of modifications that have been submitted by users for an interactive design. The list may also include other information such as identifiers of the users who provided the modifications, global-key-values generated as the collaborators collaborated on the customized product, a history log of the modifications that have been accepted, reverted, or deleted, comments that have been provided by the user, and the like. For example, one or more modifications stored in the list may be undone or redone by using a couple of clicks, not by performing countless clicks to undo or redo the customization as in conventional customization platforms.

11.6. Global-Key-Values

Digital product collaboration platform 100 may include one or more storage devices for storing global-key-values database 103. Global-key-values database 103 may store global-key-values sets that are used to track the contribution of each collaborator in a collaboration session, and to impartially establish copyrights and ownership for the customized product developed during the collaboration session.

All global-key-values pairs created and modified during a particular collaboration session are global in scope of that particular collaboration session. A global-key-value may correspond to a tuple, or a pair, that has a key and a value. While the key has a persistent meaning across all transactions, the value is scoped to a specific collaboration session. The key may indicate an attribute identifier/key, while the value may indicate a specific value for the key. For example, a global-key-value for an attribute called "owner" may include an "owner" as a key and a specific "user identifier" as a value. Detailed examples of global-key-values are described later.

For each customization project, at least one global-key-values set is generated. For example, when a customization project starts and a project owner initiates a collaboration customization session, collaboration system 100 may initiate global-key-values to indicate, for example, an identification of the owner, an identification of his license, and the like. Thus, the initial global-key-values set may include the following pairs: {Owner, user ID1}, {License, User ID1}. When the owner invites, for example, a designer to assist the owner with the customization, collaboration system 100 updates the set of global-key-values by adding an additional global-key-value pair to indicate, for example, an identification of the designer. Thus, the additional global-key-values pair may include: {Designer, user ID2}. When the owner decides to finish the collaboration customization session, collaboration system 100 may, for example, combine the relevant global-key-values pairs and initiate the processing of the pairs, as will be described later.

Examples of global-key-values may include constraints that specify rules and applicability of the rules to a product customization process, and transactions that specify entities and customization instructions for customizing the product. An example of a constraint global-key-value may include an age restriction constraint that prohibits individuals younger than 12 to customize the product. An example of a transaction global-key value may include a key-value pair that comprises customization instructions for a product customization.

In some embodiments, constraint global-key-values may be specified by an owner, a designer, and the like, during a product customization session, and may be used to specify one or more constraints to be applied to a product customization process. The examples of constraint global-key-values may include an age restriction constraint which may be represented as a key-value pair {Age, 12}. Age restriction constraint may, for example, indicate the minimum age of a user who could purchase a custom product. Since certain products may be inappropriate for children, using a constraint global-key-value pair {Age, 12} may indicate that only users who are at least 12 years old may purchase that product.

Another example of a constraint global-key-value is a content lock constraint, which may specify that a key-value or set of key-values may not be modified. Content lock may be a full lock, a partial lock, or a specific lock. For example, a user may specify that a first design is fully locked, while a second design is locked only if one attempts to modify a particular portion of the design (a partial lock or a specific lock).

Examples of constraint global-key-values may also include a blacklist content restriction constraint. This constraint may pertain to a list of content, such as imagery, text, color, or material composition. Blacklist constraint may include a blacklist key "Blacklist," and one or more names, words, and the like, to form: {Blacklist, name1, word1, . . . }.

Additional examples of constraint global-key-values may include a whitelist content restriction constraint. This constraint may pertain to a list of content, such as imagery, text, color, or material composition, that may be used to modify a key-value, or a set of key-values in the saved data of a product description, which is described later, or when a key value journal is applied to a custom product. Whitelist constraint may include a whitelist key "Whitelist," and one or more names, words, and the like, to form: {Whitelist, name1, word1, . . . .} Additional details of constraint global-key-values are described later herein.

11.7. Collaboration Components

Referring again to FIG. 2, digital product collaboration platform 100 may include one or more software applications configured to implement collaboration components 106. Collaboration components 106 may include modules that are used to implement a role-based collaboration between users. The types of the modules included in collaboration components 106 may vary and may depend on the implementation of platform 100. In the example depicted in FIG. 1C, collaboration components 106 include components configured to generate a plurality of representations. The examples of the representations are not shown in FIG. 2, but they are, however, described below.

11.7.1. User Interface Elements

Collaboration components 106 may include a component that is used to store a representation of user interface elements (not shown) that users may use to collaborate with each other and to customize interactive designs.

A user may modify values of attributes defined for an interactive design by using user interface elements presented and displayed for the user in a user interface. Examples of user interface may include a graphical user interface, a command-line interface, and the like. The user may use the user interface elements to customize/modify a style, color, size, label, ornamental design, surface qualities, material type, and the like of the interactive design. Furthermore, the user may customize individual portions of the customizable product or groups of portions of the customizable product.

The type and selection of user interface elements to be provided to a user may depend on a role assigned to the user. For example, if a user is a user, then the user may edit his own interactive design, and thus he may be provided with a user interface that includes the interface elements that allow the user to edit and view the design, invite others to help the user in editing the design, invite others to view the design, and the like.

User interface elements may be specific not only to a role assigned to a user, but also to an interactive design itself. For example, if platform 100 offers customizable ties and customizable scarfs, and a user profile for a user includes information indicating that the user is a male, then it is assumed that the user might want to customize a tie, not a scarf. Furthermore, it may be assumed that the user would like to customize a color, a material, and a shape of the tie. Based on that information, collaboration components 106 may select the user interface elements that are specific to the tie and to the selection of the tie attributes.

11.7.2. User Interface Elements for Design Areas

Collaboration components 106 may include a component that is used to store a representation of graphical user interface elements (not shown) associated with design areas of a customizable product. Design areas may include one or more areas defined within the customized product that a user may customize and/or modify. For example, if platform 100 offers customizable mugs, then design areas may include an area for showing an outside surface of the mug, an area for showing an inside surface of the mug, and an area for showing a surface of the mug handle. A product description for the design may specify that a user may modify the appearance of each of the surfaces separately, or that the user may group the surfaces and modify the group.

11.8. Product Options Framework

In some embodiments, product options framework 110 comprises a plurality of modules and applications which, when executed by one or more processors 120, cause the processors to implement the approach for collaborative video chat screen sharing using a digital product collaboration platform. As shown in FIG. 2, product options framework 110 may be configured to communicate with an attribution framework 129, a rendering framework 130, an accessories framework 132, a bundling framework 134, and a defaulting framework 136.

Attribution framework 129 may be configured to, for example, generate an attribution tree based on global-key-values collected during a customization session. Attribution framework 129 may also be configured to use the attribution tree to determine and verify corresponding licenses and copyright privileges for users/collaborators who participated in the customization session. Furthermore, attribution framework 129 may be configured to track the contributions of the collaborators and to derive the manufacturing instructions from the global-key-values collected during the session.

Product options framework 110 may be configured to receive inputs from rendering framework 130 to generate a rendering of an interactive design based on, at least in part, a current representation stored in collaboration components 106. Product options framework 110 may be also configured to receive inputs from accessories framework 132 to determine one or more accessories for an interactive design, and to include the determined accessories in the customization of the product.

Furthermore, product options framework 110 may be configured to receive inputs from building framework 134 to determine constraints for customizing an interactive design. This may include determining one or more attributes that are associated with the design and that can be customized by users. This may also include assigning default values to the determined attributes, determining ranges of values for the attributes, and/or determining sets of values that may be assigned to the attributes.

Product options framework 110 may be also configured to receive inputs from defaulting framework 126 to determine a default design for an interactive design, determine default roles that may be assigned to the user, and determine initial values for various parameters and attributes associated with the designs and collaboration sessions.

11.9. Attribute Engines

Attribute engine 108 may be configured to facilitate role-based collaboration of customizable products according to roles assigned to users and according to manufacturing constraints set forth for the products.

Attribute engine 108 may be configured to, for example, interact with collaboration components 106, product options framework 110, frameworks 130-136 and user devices 140A-140D to allow the users using devices 140A-140G to collaborate in customizing interactive designs offered by platform 10.

In some embodiments, attribute engine 108 may be configured to interact directly with users of user devices 140A-140G. In other embodiments, attribute engine 108 may be configured to interact with users of user devices 140A-140G via a computer network 131, as shown in FIG. 2.

Computer network 131 may be implemented as any type of communications network, including a local area network (LAN), wide area network (WAN), a wireless network, a secure virtual LAN (vLAN), a secure virtual WAN (vWAN), and the like.

11.10. User Computers

User devices 140A-140G may include any type of communications devices configured to facilitate communications between users and digital product collaboration platform 100. In the example depicted in FIG. 2, a user device 140A is a laptop, a user device 140B is a personal computer, a user device 140C is a personal assistant device, a user device 140D is a mobile device such as a smartphone, a user device 140E is a video camera, a user device 140F is a digital camera, and a user device 140G is a microphone configured to capture audio data and communicate the audio data to digital product collaboration platform 100.

The types and counts of user devices 140A-140G are not limited to the examples shown in FIG. 2. For example, even though FIG. 2 depicts only one laptop 140A, one personal computer 140B, one personal assistant 140C, one smartphone 140D, one video camera 140E, one digital camera 140F, and one microphone 140G, platform 100 may include a plurality of laptops 140A, a plurality of personal computers 140B, a plurality of personal assistants 140C, a plurality of smartphones 140D, a plurality of video cameras 140E, a plurality of digital cameras 140F, and a plurality of microphones 140G. In other examples, user devices may include fewer devices than those depicted in FIG. 2. In yet other examples, the user devices may include devices that are not depicted in FIG. 2.

11.11. Collaboration Server

Collaboration server 155 may be implemented in software, hardware, or both, and may be configured to cooperate with monitoring system 156 to provide monitoring capabilities to operators of the platform and/or a third-party monitoring service. The capabilities may include the ability to intercept contents of communications exchanged between the users of the collaboration platform, determine whether the communications meet the terms of the collaboration agreements, and pursue actions to address violations when the communications fail to meet the rules set forth in the agreements.

Collaboration server 155 may be part of digital product collaboration platform 100, as shown in FIG. 2. Alternatively, a collaboration server may be a system implemented in a computer server (not shown) that is separate from digital product collaboration platform 100.

In some embodiments, collaboration server 155 may comprise monitoring system 156, as shown in FIG. 2. In other embodiments, collaboration server 155 may be separate from monitoring system 156.

In some embodiments, collaboration server 155 is configured to transform ownership and license agreements, embedded in a plurality of key-value pairs journaled during a collaboration session between collaborators, into a graph-network and then into an ownership-agreement tree. The ownership-agreement tree may be used to represent the ownership and license agreements between the collaborators participating in the collaboration session.

Collaboration server 155 may be also configured to evaluate the ownership-agreement tree with respect to a plurality of role-based communications channels, established between the collaborators, for each constraint of a plurality of constraints on each collaborator of the collaborators.

The constraints may be identified from the ownership-agreement tree, and may include rules, guidance, conditions, specifications, and provisions that set forth the manner in which collaborators may communicate with each other during collaboration sessions. Examples of constraints may include agreement constraints (such as ownership agreements, license agreements, and the like), use constraints (that impose limits on editing and modifying design elements produced by collaborators), communications constraints (that impose limits to durations of the sessions, inactivity during the sessions, and the like), interactions constraints (such as contractual constraints and professional-conduct constraints), and content constraints (imposing blacklists and whitelists on the communications). Some of the constraints may be system-wide constraints and apply to one or more, or all, collaborations supported by a collaboration platform.

11.12. Monitoring System

In some embodiments, monitoring system 156 is implemented as a component of collaboration server 155, as shown in FIG. 2. In other embodiments, monitoring system 156 is implemented as a server (not shown) separate from collaboration server 155.

Monitoring system 156 may be configured to cooperate with collaboration server 155 in terms of tracking and monitoring the communications exchanged between collaborators, generating transcripts of the communications, and parsing the transcripts to determine characteristics of the corresponding data streams.

Monitoring system 156 may also be configured to assist collaboration server 155 in evaluating an ownership-agreement tree with respect to role-based communications channels, established between the collaborators, to determine whether any communications exchanged between the collaborators violate any constraints of a plurality of constraints.

11.13. Processors

In some embodiments, digital product collaboration platform 100 comprises agreement processor 152, communications processor 153, processor 120, and/or monitoring system 156. Among other things, components 152-153, 120 and 156 are configured to support collaboration server 155 in journaling key-value pairs that capture ownership and license agreements. They may also be configured to support transforming the key-value pairs into a graph-network and then into an ownership-agreement tree.

Components 152-153, 120 and 156 may also be configured to support collaboration server 155 in evaluating the ownership-agreement tree with respect to a plurality of role-based communications channels, established between the collaborators, for each constraint on each collaborator.

Moreover, components 152-153, 120 and 156 may support collaboration server 155 in determining whether one or more communications, monitored in the plurality of role-based communications channels, violate one or more constraints of the plurality of constraints.

That determination may include, among other things, generating transcripts of data intercepted from data communications channels supporting communications sessions established between collaborators. For example, components 152-153, 156 and 120 may generate a video transcript of the video chat and associate the transcript with the corresponding collaboration session. Components 152-153, 120 and 156 may provide the content of the transcript, including video frames, audio clips and chat texts, to monitoring system 156 and/or collaboration server 155.

Components 152-153, 120 and 156 may also be configured to collect statistical and diagnostic information about communications sessions established to support collaboration between users. For a communications session, the information may include information about the duration of the session, a count of retransmissions performed during the session, an indication of whether the session ended abruptly, and the like.

12. Manufacture of Customized Products

Suppose that a custom digital product is a customized greeting card. Furthermore, suppose that in the course of one or more collaboration sessions, collaborators developed an interactive, digital design of the customized greeting card. The processes described above may be employed to digital print the customized greeting card.

In some embodiments, various means are provided for handling manufacturing of custom products provided in a digital form. In this context, a digital product is a product that may be fully realized in software and digital media. Such products may have functionalities that are similar to functionalities of physical products. For example, it is possible to manufacture a physical custom greeting card using the methods described herein, and it is also possible to produce a digital greeting card by using very similar means. Instead of publishing a greeting card using a printing process, a digital greeting card may be manufactured by publishing it in a digital form which may be viewed by a specific digital service.

Constraints for generating digital and physical greeting cards may be similar. The constraints may be managed by a product options framework, described above. Furthermore, generating digital and physical greeting cards may have resolution constraints. That means that for an optimal quality of the visual presentation of the cards, each card generating process may have a constraint in the number of pixels-per-inch that is required.

Furthermore, generating digital and physical greeting cards may have size and ratio aspect constraints. Based on the paper size in the physical case, and on screen size in the digital case, there are constraints on the formatting and placement of design elements for the greeting card.

Moreover, both have color constraints. Each may have a target ICC color profile that imposes a specific gamut of colors for manufacturing the product. In the case of the physical product, it may be a CMYK profile such as U.S. Web Coated (SWOP) v2. In the case of the digital version, it may be sRGB IEC61966-2.1. Publishing each product requires rendering each design element to fit the constraints.

Furthermore, both are published using manufacturing instructions that meet specific digital standards. Each must be expressed as a specific set of manufacturing instructions that meet the constraints. Finally, the customization and collaboration of each are usually the same.

In some embodiments, supporting digital products may include, but is not limited to, greeting cards, invitations, business insignias (such as logos, email and social media tags), birth announcements, personal identities, corporate communications, and virtual products, and as a token or representation of a physical product.

13. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
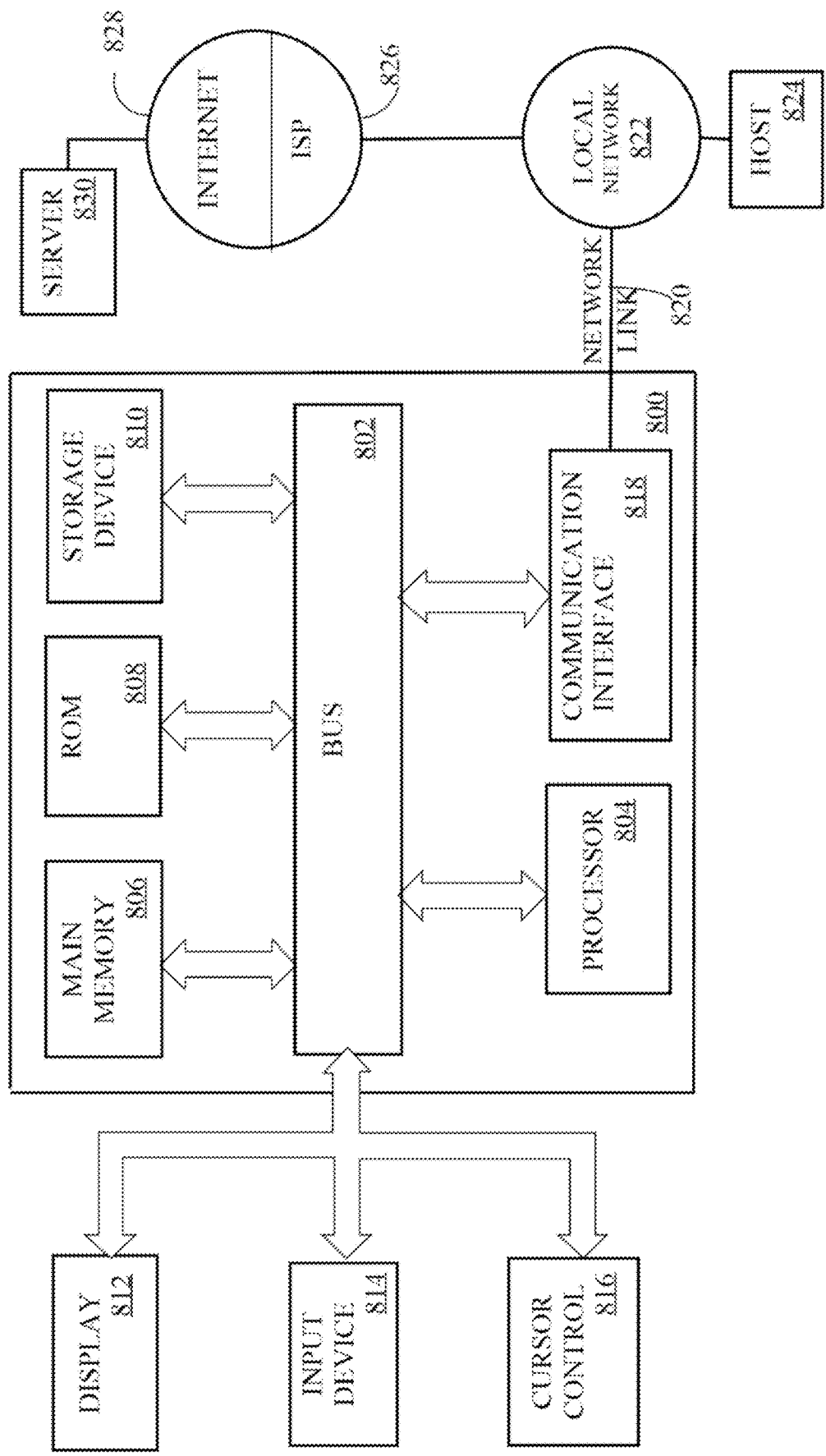
FIG. 8 is a block diagram of a computer system on which embodiments of the approach may be implemented.

FIG. 8 is a block diagram that depicts an example computer system 800 upon which embodiments may be implemented. Computer system 800 includes a bus 802 or other communication mechanism for communicating information, and a processor 804 coupled with bus 802 for processing information. Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. Although bus 802 is illustrated as a single bus, bus 802 may comprise one or more buses. For example, bus 802 may include without limitation a control bus by which processor 804 controls other devices within computer system 800, an address bus by which processor 804 specifies memory locations of instructions for execution, or any other type of bus for transferring data or signals between components of computer system 800.

An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input-device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic or computer software which, in combination with the computer system, causes or programs computer system 800 to be a special-purpose machine. According to one embodiment, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 800, various computer-readable media are involved, for example, in providing instructions to processor 804 for execution. Such a medium may take many forms, including but not limited to, non-volatile media and volatile media. Non-volatile media includes, for example, optical or magnetic disks, such as storage device 810. Volatile media includes dynamic memory, such as main memory 806. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated service digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic, or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A method implemented in a computer collaboration platform and for manufacturing a group of customized products that share an aesthetic design, the method comprising:
receiving, by a computer processor, an indication of a particular design style from a user computer;
determining, by the computer processor, based on the indication of a particular design style, one or more functional product groups that comprise a plurality of custom products having indicia of the particular design style;
initiating, by the computer processor, a collaboration session between the user computer and one or more collaborators to cause displaying the plurality of custom products on a user device and on collaborators devices, to allow a user and the one or more collaborators to view the plurality of custom products, and to select, from the plurality of custom products, one or more particular custom products;
in response to receiving a selection of the one or more particular custom products, selected from the plurality of custom products: generating, by the computer processor, based on the one or more particular custom products, a group of customized products comprising the one or more particular custom products, each particular customized product associated with a product type of a plurality of product types, each product type of the plurality of product types associated with a manufacturing constraint of multiple manufacturing constraints, each particular customized product having shared content that all of the one or more particular custom products share;
for a particular customized product from the group of customized products:
obtaining, by the computer processor, a manufacturing method for manufacturing the particular customized product;
determining, by the computer processor, a product type of the particular customized product and a manufacturing constraint associated with the product type;
based on, at least in part, the manufacturing constraint, determining, by the computer processor, physical constraints and manufacturing instructions for manufacturing the particular customized product using the manufacturing method;
generating, by the computer processor, transformed shared content by transforming the shared content, which all of the one or more particular custom products share, to meet a specific digital standard that satisfies the physical constraints for manufacturing the particular customized product; and
storing, by the computer processor, the transformed shared content in association with the group of customized products for manufacturing the particular customized product;
based on at least the transformed shared content, automatically generating, by the computer processor, publishing manufacturing instructions;
transmitting, by the computer processor, the publishing manufacturing instructions to product customization servers in real time to cause manufacturing entities to generate the particular customized product based on the publishing manufacturing instructions.

2. The method of claim 1, wherein the indication of a particular design style is provided via a graphical user interface that allows the user to import images depicting items that conform with the particular design style or to describe the particular design style;
wherein the graphical user interface is arranged as an inspiration board that depicts the images imported by the user;
wherein the inspiration board is a layout of certain kinds of designs, patterns, styles, objects, or items having the particular design style;
wherein the inspiration board provides a design look of the particular design style rather than individual products; and
wherein the indication of the particular design style is determined based on one or more of: patterns, colors, or ornamental style of the images imported to the inspiration board.

3. The method of claim 2, wherein a description of the particular design style is provided by the user computer to the computer collaboration platform via one or more communications channels;
wherein the one or more communications channels include one or more of: a text chat, a video chat, a phone chat, or a GUI;
wherein the one or more communications channels facilitate a collaborative video screen sharing.

4. The method of claim 2, wherein the one or more functional product groups are generated by a computer collaboration platform by grouping custom products based on certain types of designs, looks or styles;
wherein a functional product group, of the one or more functional product groups, includes a plurality of custom product that have a certain type of design, look or style;
wherein a functional product group, of the one or more functional product groups, includes custom products designed by one or more designers;
wherein a functional product group, of the one or more functional product groups, includes tags associated with design aesthetic styles, aesthetic genre, or aesthetic theme;
wherein a functional product group, of the one or more functional products groups, includes products that are associated with similar aesthetic style; and
wherein the certain type of design includes one or more of: a certain pattern, a certain color palette, a certain feel, a certain material, a certain texture, a certain finish, or a certain ornamental style.

5. The method of claim 1, wherein causing displaying the plurality of custom products on the user device comprises generating a display of the plurality of custom products and presenting the plurality of custom products in a carousel arrangement.

6. The method of claim 1, further comprising: in response to receiving a user input for ordering a custom product: sending the manufacturing instructions to a manufacturing platform to cause the manufacturing platform to manufacture the customized product.

7. The method of claim 1, wherein the shared content comprises a shared set of text, image, or color content that all customized products of the group of customized products share, and that can be applied to each customized product of the group of customized products; and
   wherein the shared set of text, image, or color content corresponds to attributes that may be applied to any customized product in the group of customized products.

8. The method of claim 1, wherein one of the multiple manufacturing constraints is specific to a type of a customized product from the group of customized products; wherein the multiple manufacturing constraints are applied to content attributes of at least two customized products from the group of customized products.

9. The method of claim 7, wherein the user and the one or more collaborators have assigned roles that specify access, privileges and agreements setting forth a type of a collaboration video chat screen sharing.

10. The method of claim 9, wherein a graphical user interface is automatically built from shared content attributes for the group of customized products;
    wherein the graphical user interface accepts inputs for one or more attributes that are not provided by the shared content attributes; and
    wherein the shared content attributes for the group of customized products are subject to transformation, translation and constraining for each separate product within the group of the customized products; and
    wherein customized products in the group of customized products are segmented based on a type of a customized product in the group of customized products;
    wherein the customized products in the group of customized products are segmented based on one or more of: a layout, an image style, or a text content.

11. One or more non-transitory computer readable storage media storing one or more instructions which, when executed by one or more processors, cause the one or more processors to perform:
    receiving, by a computer processor, an indication of a particular design style from a user computer;
    determining, by the computer processor, based on the indication of a particular design style, one or more functional product groups that comprise a plurality of custom products having indicia of the particular design style;
    initiating, by the computer processor, a collaboration session between the user computer and one or more collaborators to cause displaying the plurality of custom products on a user device and on collaborators devices, to allow the user and the one or more collaborators to view the plurality of custom products, and to select, from the plurality of custom products, one or more particular custom products;
    in response to receiving a selection of the one or more particular custom products, selected from the plurality of custom products: generating, by the computer processor, based on the one or more particular custom products, a group of customized products comprising the one or more particular custom products, each particular customized product associated with a product type of a plurality of product types, each product type of the plurality of product types associated with a manufacturing constraint of multiple manufacturing constraints, each particular customized product having shared content that all of the one or more particular custom products share;
    for a particular customized product from the group of customized products:
        obtaining, by the computer processor, a manufacturing method for manufacturing the particular customized product;
        determining, by the computer processor, a product type of the particular customized product and a manufacturing constraint associated with the product type;
        based on, at least in part, the manufacturing constraint, determining, by the computer processor, physical constraints and manufacturing instructions for manufacturing the particular customized product using the manufacturing method;
        generating, by the computer processor, transformed shared content by transforming the shared content, which all of the one or more particular custom products share, to meet a specific digital standard that satisfies the physical constraints for manufacturing the particular customized product; and
        storing, by the computer processor, the transformed shared content in association with the group of customized products for manufacturing the particular customized product;
        based on at least the transformed shared content, automatically generating, by the computer processor, publishing manufacturing instructions;
        transmitting, by the computer processor, the publishing manufacturing instructions to product customization servers in real time to cause manufacturing entities to generate the particular customized product based on the publishing manufacturing instructions.

12. The one or more non-transitory computer readable storage media of claim 11, wherein the indication of a particular design style is provided via a graphical user interface that allows the user to import images depicting items that conform with the particular design style or to describe the particular design style;
    wherein the graphical user interface is arranged as an inspiration board that depicts the images imported by the user;
    wherein the inspiration board is a layout of certain kinds of designs, patterns, styles, objects, or items having the particular design style;
    wherein the inspiration board provides a design look of the particular design style rather than individual products; and
    wherein the indication of the particular design style is determined based on one or more of: patterns, colors, or ornamental style of the images imported to the inspiration board.

13. The one or more non-transitory computer readable storage media of claim 12, wherein a description of the particular design style is provided by the user via one or more communications channels;
    wherein the one or more communications channels include one or more of: a text chat, a video chat, a phone chat, or a GUI;
    wherein the one or more communications channels facilitate a collaborative video screen sharing.

14. The one or more non-transitory computer readable storage media of claim 12, wherein the one or more functional product groups are generated by a computer collaboration platform by grouping custom products based on certain types of designs, looks or styles;
- wherein a functional product group, of the one or more functional product groups, includes a plurality of custom product that have a certain type of design, look or style;
- wherein a functional product group, of the one or more functional product groups, includes custom products designed by one or more designers;
- wherein a functional product group, of the one or more functional product groups, includes tags associated with design aesthetic styles, aesthetic genre, or aesthetic theme;
- wherein a functional product group, of the one or more functional products groups, includes products that are associated with similar aesthetic style; and
- wherein the certain type of design includes one or more of: a certain pattern, a certain color palette, a certain feel, a certain material, a certain texture, a certain finish, or a certain ornamental style.

15. The one or more non-transitory computer readable storage media of claim 11, wherein causing displaying the plurality of custom products on the user device comprises generating a display of the plurality of custom products and presenting the plurality of custom products in a carousel arrangement.

16. The one or more non-transitory computer readable storage media of claim 11, storing additional instructions for: in response to receiving a user input for ordering a custom product: sending the manufacturing instructions to a manufacturing platform to cause the manufacturing platform to manufacture the customized product.

17. The one or more non-transitory computer readable storage media of claim 11, wherein the shared content comprises a shared set of text, image, or color content that all customized products of the group of customized products share, and that can be applied to each customized product of the group of customized products; and
- wherein the shared set of text, image, or color content corresponds to attributes that may be applied to any customized product in the group of customized products.

18. The one or more non-transitory computer readable storage media of claim 11, wherein one of the multiple manufacturing constraints is specific to a type of a customized product from the group of customized products; wherein the multiple manufacturing constraints are applied to content attributes of at least two customized products from the group of customized products.

19. The one or more non-transitory computer readable storage media of claim 17, wherein the user and the one or more collaborators have assigned roles that specify access, privileges and agreements setting forth a type of a collaboration video chat screen sharing.

20. The one or more non-transitory computer readable storage media of claim 19, wherein a graphical user interface is automatically built from shared content attributes for the group of customized products;
- wherein the graphical user interface accepts inputs for one or more attributes that are not provided by the shared content attributes; and
- wherein the shared content attributes for the group of customized products are subject to transformation, translation and constraining for each separate product within the group of the customized products; and
- wherein customized products in the group of customized products are segmented based on a type of a customized product in the group of customized products;
- wherein the customized products in the group of customized products are segmented based on one or more of: a layout, an image style, or a text content.

* * * * *